(12) United States Patent
Bruce

(10) Patent No.: US 11,699,253 B2
(45) Date of Patent: Jul. 11, 2023

(54) SYSTEMS, METHODS, AND DEVICES FOR IMAGE PROCESSING

(71) Applicant: UIArmor.com LLC

(72) Inventor: Christopher J. Bruce, Greenwood Village, CO (US)

(73) Assignee: UIArmor.com LLC, Greenwood Village, CO (US)

( * ) Notice: Subject to any disclaimer, the term of this patent is extended or adjusted under 35 U.S.C. 154(b) by 0 days.

(21) Appl. No.: 17/498,439

(22) Filed: Oct. 11, 2021

(65) Prior Publication Data

US 2022/0027665 A1    Jan. 27, 2022

Related U.S. Application Data

(63) Continuation of application No. 17/306,216, filed on May 3, 2021, now Pat. No. 11,205,090, which is a continuation of application No. 17/161,304, filed on Jan. 28, 2021, now Pat. No. 11,017,265.

(60) Provisional application No. 62/967,097, filed on Jan. 29, 2020.

(51) Int. Cl.
  *G06T 11/20* (2006.01)
  *G06F 18/2113* (2023.01)

(52) U.S. Cl.
  CPC ........ *G06T 11/203* (2013.01); *G06F 18/2113* (2023.01)

(58) Field of Classification Search
  CPC .................................. G06T 7/149; G06T 7/12
  See application file for complete search history.

(56) References Cited

U.S. PATENT DOCUMENTS

| | | | |
|---|---|---|---|
| 5,490,246 A | 2/1996 | Brotsky et al. | |
| 5,748,202 A | 5/1998 | Nakatsuka et al. | |
| 6,356,269 B1 | 3/2002 | Nakatsuka et al. | |
| 6,400,842 B2 | 6/2002 | Fukuda | |
| 7,068,328 B1 * | 6/2006 | Mino | G06T 5/009 348/438.1 |
| 7,096,143 B2 * | 8/2006 | Ternasky | G06F 3/1232 702/123 |
| 7,142,697 B2 | 11/2006 | Huang et al. | |
| 7,164,499 B1 | 1/2007 | Gupta | |
| 7,181,081 B2 | 2/2007 | Sandrew | |
| 7,327,859 B1 | 2/2008 | Chau | |

(Continued)

OTHER PUBLICATIONS

Office Action for U.S. Appl. No. 17/498,285, dated Nov. 21, 2022.

(Continued)

*Primary Examiner* — Yosef Kassa
(74) *Attorney, Agent, or Firm* — Jason H. Vick; Sheridan Ross, PC

(57) ABSTRACT

A device includes at least one processor and memory including instructions that when executed by the at least one processor, cause the at least one processor to scan an input image including pixels that have either a first state or a second state opposite the first state, initiate a first cluster and a first polygon that belongs to the first cluster upon encountering a first pixel of the input image that has the first state, execute a first set of operations to form the first polygon, generate an indication of one or more characteristics of the input image based on at least the first cluster, and output the indication.

29 Claims, 22 Drawing Sheets
(13 of 22 Drawing Sheet(s) Filed in Color)

(56) References Cited

U.S. PATENT DOCUMENTS

| | | | |
|---|---|---|---|
| 7,436,994 B2 * | 10/2008 | Huang | G06V 30/413 |
| | | | 382/176 |
| 7,447,353 B2 | 11/2008 | Diederichs et al. | |
| 7,526,131 B2 * | 4/2009 | Weber | G06T 7/149 |
| | | | 382/199 |
| 7,986,831 B2 | 7/2011 | Nielsen | |
| 8,145,677 B2 | 3/2012 | Al-Shameri | |
| 8,200,004 B2 | 6/2012 | Michelsson et al. | |
| 8,224,089 B2 | 7/2012 | Nielsen | |
| 8,374,383 B2 | 2/2013 | Long et al. | |
| 8,428,354 B2 | 4/2013 | Prasad et al. | |
| 8,666,430 B2 | 3/2014 | Wigren et al. | |
| 8,694,515 B2 | 4/2014 | Takata et al. | |
| 8,768,046 B2 | 7/2014 | Ernst et al. | |
| 9,177,225 B1 | 11/2015 | Cordova-Diba et al. | |
| 9,472,022 B2 | 10/2016 | Neumann et al. | |
| 11,017,265 B1 | 5/2021 | Bruce | |
| 11,158,031 B1 | 10/2021 | Bruce | |
| 2003/0001837 A1 | 1/2003 | Baumberg | |
| 2004/0085313 A1 | 5/2004 | Moreton et al. | |
| 2005/0068333 A1 | 3/2005 | Nakahashi et al. | |
| 2005/0104893 A1 | 5/2005 | Kii et al. | |
| 2007/0139440 A1 | 6/2007 | Crow et al. | |
| 2008/0273034 A1 | 11/2008 | Fenney et al. | |
| 2010/0066739 A1 | 3/2010 | Ishibashi | |
| 2013/0100134 A1 | 4/2013 | Cervelli et al. | |
| 2015/0178584 A1 | 6/2015 | Aller | |
| 2017/0228867 A1 | 8/2017 | Baruch | |
| 2018/0125443 A1 | 5/2018 | Takebe et al. | |
| 2019/0295297 A1 | 9/2019 | Mason | |
| 2021/0089808 A1 | 3/2021 | Yu et al. | |
| 2021/0256298 A1 | 8/2021 | Bruce | |

OTHER PUBLICATIONS

International Preliminary Report on Patentability for International Application No. PCT/US2021/015499, dated Aug. 11, 2022.

U.S. Appl. No. 17/498,285, filed Oct. 11, 2021, Bruce.

International Search Report for International Application No. PCT/US2021/015499, dated Apr. 8, 2021.

Written Opinion for International Application No. PCT/US2021/015499, dated Apr. 8, 2021.

International Search Report for International Application No. PCT/US2021/033936, dated Sep. 10, 2021.

Written Opinion for International Application No. PCT/US2021/033936, dated Sep. 10, 2021.

Office Action for U.S. Appl. No. 17/161,304, dated Mar. 17, 2021.

Notice of Allowance for U.S. Appl. No. 17/161,304, dated Mar. 30, 2021.

Office Action for U.S. Appl. No. 17/306,216, dated Aug. 31, 2021.

Notice of Allowance for U.S. Appl. No. 17/306,216, dated Sep. 24, 2021.

Office Action for U.S. Appl. No. 17/329,011, dated Aug. 9, 2021.

Notice of Allowance for U.S. Appl. No. 17/329,011, dated Sep. 9, 2021.

* cited by examiner

| Total Area | Symbol | Cluster | Polygon | Side | Edge points | Area (actual points) | Bounds |
|---|---|---|---|---|---|---|---|
| 53 pixels | 3 | 1 | 1 | Outer | 46 | 16 | 1,2 5x8 |
| | 9 | 2 | 2 | Outer | 36 | 18 | 11,2 5x8 |
| | | | 3 | Inner | 12 | | 12,3 3x3 |
| | 8 | 3 | 4 | Outer | 32 | 19 | 21,2 5x8 |
| | | | 5 | Inner | 10 | | 22,3 3x2 |
| | | | 6 | Inner | 12 | | 22,6 3x3 |

Key Sequence: 144, 25, 160, 19, 33, 34, 66, 100, 130, 76, 132, 136, 9, 145, 10, 49, 18, 34, 36, 70, 40, 196, 72, 136, 144

Key sequence: 144, 136, 72, 196, 70, 36, 34, 18, 49, 145, 9, 136, 132, 76, 100, 66, 34, 33, 19, 25, 144

Key sequence: 128, 136, 8, 136, 128

SYSTEMS, METHODS, AND DEVICES FOR IMAGE PROCESSING

CROSS REFERENCE TO RELATED APPLICATIONS

This application is a Continuation of U.S. patent application Ser. No. 17/306,216, filed May 3, 2021, now U.S. Pat. No. 11,205,090, which is a Continuation of U.S. patent application Ser. No. 17/161,304, filed Jan. 28, 2021, now U.S. Pat. No. 11,017,265, which claims priority to U.S. Provisional Application No. 62/967,097, filed on Jan. 29, 2020, the entire contents of each are hereby incorporated by reference in their entirety.

FIELD

The present disclosure is generally directed to systems, methods, and devices for image processing.

BACKGROUND

Image processing techniques include techniques for analyzing an input image to reveal characteristics of the input image and/or to produce an output image from the input image.

SUMMARY

At least one example embodiment is directed to a device including at least one processor, and memory including instructions that when executed by the at least one processor, cause the at least one processor to scan an input image including pixels that have either a first state or a second state opposite the first state, initiate a first cluster and a first polygon that belongs to the first cluster upon encountering a first pixel of the input image that has the first state, execute a first set of operations to form the first polygon, generate an indication of one or more characteristics of the input image based on at least the first cluster, and output the indication.

At least one example embodiment is directed to a method that includes scanning an input image including pixels that have either a first state or a second state opposite the first state, initiating a first cluster and a first polygon that belongs to the first cluster upon encountering a first pixel of the input image that has the first state, executing a first set of operations to form the first polygon, generating an indication of one or more characteristics of the input image based on at least the first cluster, and outputting the indication.

At least one example embodiment is directed to a system including a display, at least one processor, and memory including instructions that when executed by the at least one processor, cause the at least one processor to scan an input image including pixels that have either a first state or a second state opposite the first state, initiate a first cluster and a first polygon that belongs to the first cluster upon encountering a first pixel of the input image that has the first state, execute a first set of operations to form the first polygon, generate an indication of one or more characteristics of the input image based on at least the first cluster, output the indication to the display.

Additional features and advantages are described herein and will be apparent from the following description and the figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures, which are not necessarily drawn to scale.

DETAILED DESCRIPTION

Figure 1:
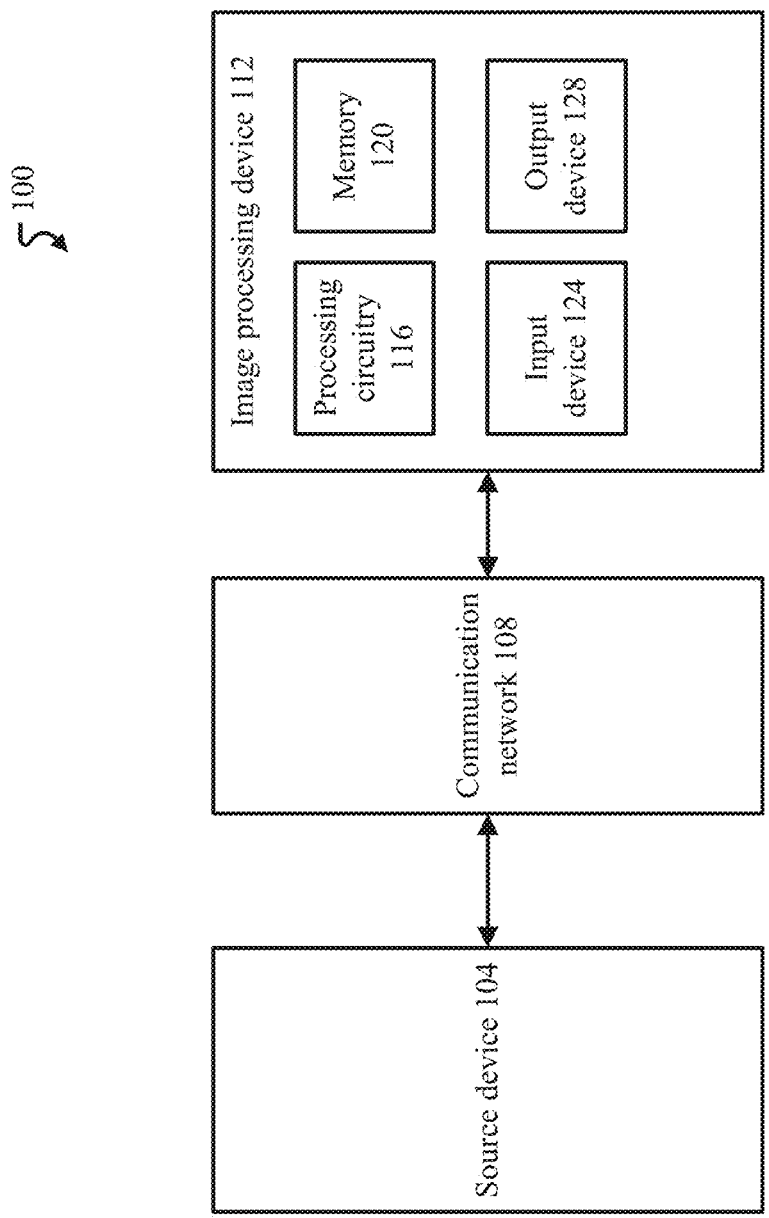
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, stages, operations, elements, and/or components, but do not preclude the presence or addition of one or more other features, integers, stages, operations, elements, components, and/or groups thereof. The term "and/or" includes any and all combinations of one or more of the associated listed items.

Where reference to general element or set of elements is appropriate instead of a specific element, the description may refer to the element or set of elements by its root term. For example, when reference to a specific element $X_1$, $X_2$, etc. is not necessary, the description may refer to the element(s) in general as "X."

FIG. 1 illustrates a system 100 according to at least one example embodiment. The system 100 includes a source device (or device) 104, a communication network 108, and an image processing device (or device) 112. In at least one example embodiment, source 104 and/or device 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. As another specific but non-limiting example, the devices 104 and 112 may correspond to servers offering information resources, services and/or applications to user devices, client devices, or other hosts in the system 100. In at least one example embodiment, the source device 104 comprises any suitable device that generates, receives, and/or stores a source image to be processed by the device 112 as an input image to output an output image. Such source devices may include but are not limited to a camera (stand alone or incorporated as part of another device such as a mobile phone, a laptop, a tablet, etc.), a document scanner (e.g., a copy machine), a memory having the source image stored thereon and that is local to or remote from a device that generated the source image, and/or the like.

The communication network 108 may comprises a wired network and/or a wireless network that enables wired and/or wireless communication between devices 104 and 112. Examples of the communication network 108 that may be used to connect the devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. The communication network 108 may enable wireless communication between devices 104 and 112 using one or more protocols in the 802.11 suite of protocols, near-field communication (NFC) protocols, Bluetooth protocols, LTE protocols, 5G protocols, and/or the like. The devices 104 and 112 may include one or more communication interfaces to facilitate wired and/or wireless communication over the communication network 108.

Although the devices 104 and 112 are shown as separate devices communicating over the communication network 108, it should be appreciated that the devices 104 and 112 and the communication network 108 may be incorporated into a single device (e.g., a server, a personal computer, and/or the like) so that the source image, the input image that is derived from the source image, and the output image that is based on the input image are generated and/or processed by the same device.

The processing circuitry 116 may comprise suitable software, hardware, or a combination thereof for processing images from source device 104 and carrying out other types of computing tasks. The processing circuitry 116 may carry out the various image processing operations and algorithms described herein. The memory 120 may include executable instructions and the processing circuitry 116 may execute the instructions on the memory 120. Thus, the processing circuitry 116 may include a microprocessor, microcontroller, and/or the like to execute the instructions on the memory 120. The memory 120 may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory 120 and processing circuitry 116 may be integrated into a common device (e.g., a microprocessor may include integrated memory). Additionally or alternatively, the processing circuitry 116 may comprise hardware, such as an application specific integrated circuit (ASIC). Other non-limiting examples of the processing circuitry 116 include an Integrated Circuit (IC) chip, a Central Processing Unit (CPU), a General Processing Unit (GPU), a Field Programmable Gate Array (FPGA), a digital signal processor (DSP), a collection of logic gates or transistors, resistors, capacitors, inductors, diodes, or the like. Some or all of the processing circuitry 116 may be provided on a Printed Circuit Board (PCB) or collection of PCBs. It should be appreciated that any appropriate type of electrical component or collection of electrical components may be suitable for inclusion in the processing circuitry 116.

The processing circuitry 116 may send and/or receive signals to and/or from other elements of the system 100 to control various operations for the system 100.

Although not explicitly shown, it should be appreciated that devices 104 and 112 may include other processing devices, storage devices, and/or communication interfaces generally associated with computing tasks, such as sending and receiving data over a wired and/or wireless connection.

The input device 124 includes suitable hardware and/or software that enables input to the system 100 (e.g., user input). The input device 124 may include a keyboard, a mouse, a touch-sensitive pad, touch-sensitive buttons, a touch-sensitive portion of a display, mechanical buttons, switches, and/or other control elements for providing user input to the system 100 to enable user control over certain functions of the system 100.

The output device 128 may include suitable hardware and/or software that produces visual, audio, and/or tactile feedback for a user or other interested party based on one or more inputs from the processing circuitry 116. In at least one example embodiment, the output device 128 includes one or more displays display to display an output image and/or one or more characteristics of an input image after processing of the input image by the device 112. The input image may be based on a source image received from the source device 104 over the communication network 108. The display may include any suitable type of display, such as a liquid crystal display (LCD), a light emitting diode (LED) display, and/or the like. The output device 128 may be a stand-alone device or a device integrated as part of another device, such as a smart phone, a laptop, a tablet, and/or the like.

Although the input device 124 and the output device 128 are illustrated as being part of the image processing device 112, the input device 124 and/or the output device 128 may be embodied separate from the device 112 according to design preferences of the system 100.

Figures 2A, 2B:
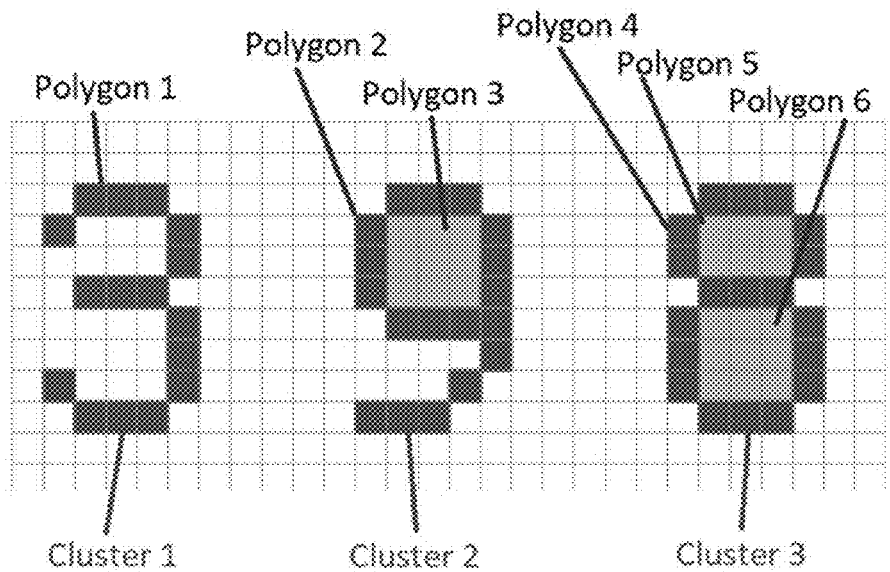
FIG. 2A illustrates various sample images comprised of polygons.
FIG. 2B illustrates a table outlining a complete polygon profile of the image in FIG. 2A.

FIG. 2A illustrates various sample images comprised of polygons according to at least one example embodiment. For each polygon, example embodiments determine the number of contiguous pixels, the points that compose a cluster (where each cluster may be defined as one or more interrelated polygons and/or as a set of vertically, horizontally, and/or diagonally adjacent (e.g., immediately adjacent) pixels), the points that form the outer and inner polygons for each cluster (where each polygon may be defined as a cyclic sequence of points with each point have a prior point and a next point and where no polygon intersects any other polygon and all polygons are simple polygons), precise point sequences of all polygons with no pixel corner cutting (i.e., no pixel rounding), complete information of how each polygon relates to another polygon (e.g., shared boundaries, outer or inner polygon, percent of parent polygon, etc.), precise information about each polygon (e.g., location, center, area, perimeter, and the like) as a result of having the point sequences, and/or total area of pixels included in a polygon. This set of processing goals may be referred to as determining an image's complete polygon profile. In general, a cluster has one polygon that defines an outer perimeter of the cluster, and the cluster may or may not include additional polygons. If a cluster does include additional polygons, these polygons correspond to holes (or inner polygons) in the cluster.

FIG. 2B further illustrates a table outlining the complete polygon profile of the image in FIG. 2A. The complete polygon profile an input image may be used to draw one or more conclusions about the input image. As shown, the table lists the total number of pixels used for each symbol 3, 9, 8, the cluster number, a number of polygons, whether each polygon is an outer or inner polygon, a number of edge points or pixel edges used for each polygon, a number of pixels for each symbol (16, 18, and 19), and bounds of each polygon. The notation for a bound of a polygon indicates the pixel coordinates of a polygon and a pixel area for the polygon. For example, polygon 1 in FIG. 2B has a bound 1,2, 5×8, which means that polygon 1 begins at column 1, row 2 (i.e., 1,2) where column 0 is the leftmost column of pixels and row 0 is the uppermost column of pixels, and that polygon 1 spans 5 columns of pixels and 8 rows of pixels (i.e., 5×8).

Still with reference to FIGS. 2A and 2B, each polygon that is included in symbols 3, 8, and 9 has a precise and unique point sequence: p1, p2 . . . pN where pN connects back to p1. In addition, all polygons are associated with a cluster. For example, in cluster 3, polygons 4, 5, and 6 are related to each other vs. being mutually independent as in the marching squares algorithm. All polygon traces (i.e., the outer and inner edges of each polygon) lie on pixel boundaries. That is, no pixel is cut or interpolated. In addition, no two polygons intersect, and all polygons are simple in that no polygon intersects itself. Both of these characteristics are useful for downstream mathematical logic to accurately process the polygon. For example, it is easier to compute the area of a polygon that has no self-intersections than a polygon that self-intersects.

To understand one advantage of inventive concepts, consider treating the clusters in FIG. 2A as a collection of isolated pixels (for example, as in a flood fill algorithm). An algorithm such as flood fill has no information about how the pixels join each other. Under this limitation, the three symbols in FIG. 2A are very similar. For instance, if one adds two pixels to the '3' then it will look like a '9,' and if one adds three pixels to the '3', then it will look like an '8'. Therefore, if images are treated as isolated pixels, then deciding between different symbols boils down to a small margin of three pixels in this example. Furthermore, matching symbols algorithmically under this limitation would require a brute scan of every instance of every size of every symbol to get a practical match. This approach is memory intensive, time intensive, error-prone, and inefficient.

Inventive concepts, on the other hand, are more decisive. For example, symbol '3' is defined by only one polygon (the outer polygon), symbol '9' is defined by two polygons: outer and inner polygons, and symbol '8' is defined by three polygons: one outer polygon and two inner polygons. Within an algorithm according to inventive concepts, the three symbols are completely different. Furthermore, these polygon properties are generally true regardless of size and font of the symbols. Stated another way, the three symbols are topologically distinct: '3' has no holes, '9' has one hole, and '8' has two holes. Processing images with symbols according to inventive concepts enhances the downstream ability to correctly identify the symbols because it is possible to match general properties of each symbol (e.g., number of polygons) with known properties of other symbols, which uses less memory, saves time, reduces error, and/or increases efficiency.

FIG. 2A illustrates ambiguous pixel cases where two polygons share a point. Processing methods according to example embodiments correctly disambiguate each case of a shared point. In one example embodiment, an ambiguous pixel is defined as a pixel with two opposing sides where it is unknown whether the two sides are part of a single polygon or multiple polygons. This concept is described more detail below with reference to FIG. 3.

Figure 3:
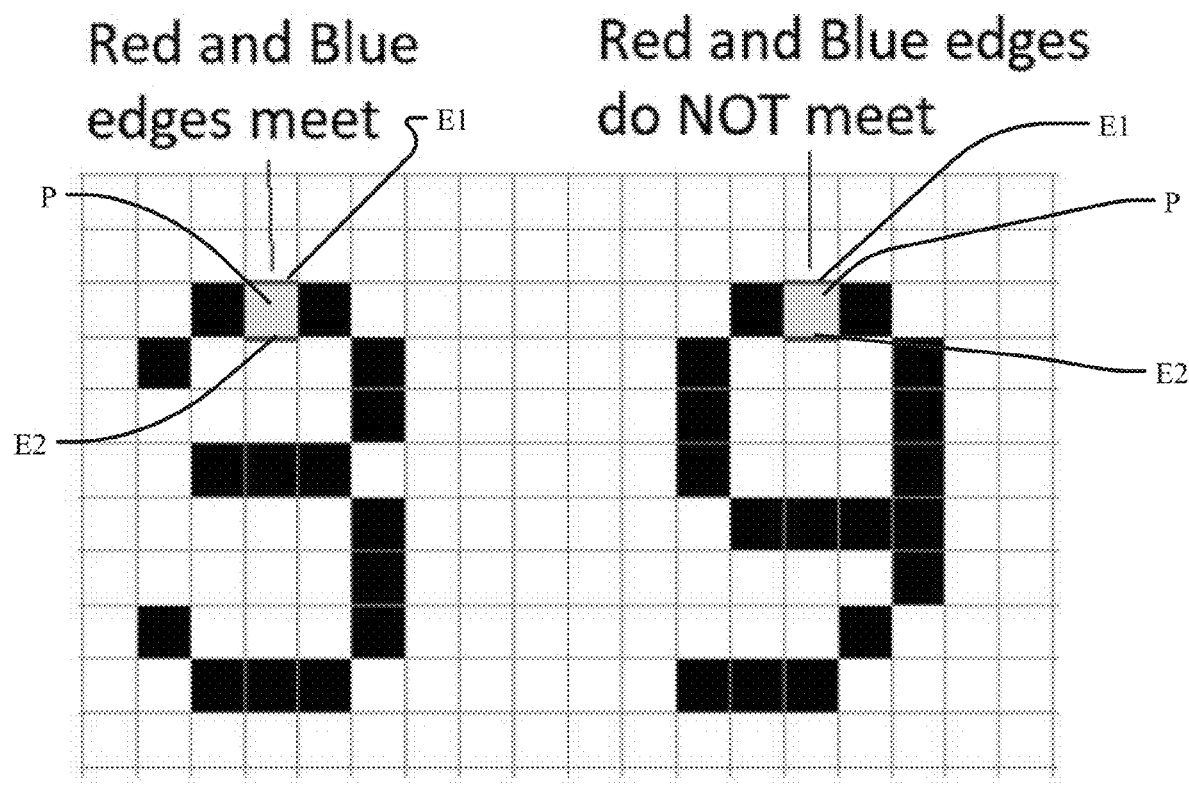
FIG. 3 illustrates edges for pixels in two of the symbols of FIG. 2A.

FIG. 3 illustrates edges for pixels in two of the symbols in FIG. 2A. As shown for a pixel P in '3', the edges E1 and E2 eventually meet to form the polygon perimeter for the symbol '3'. For the pixel P in '9', however, the edges E1 and E2 do not meet because each edge is part of a unique polygon. Image processing methods according to example embodiments connect all the edges of each polygon to disambiguate edges of each pixel to determine how pixel edges relate to polygons, which in turn informs on how a pixel is used in a symbol. As may be appreciated from the instant description, image processing methods according to example embodiments may have an optimal O(n) to O(n$^2$) execution time depending on the input image.

FIGS. 4A to 4D illustrate a plurality of keys according to at least one example embodiment. Image processing methods according to example embodiments generate and consult the keys in FIGS. 4A to 4D in order to process an input image. As discussed in more detail below with reference to the figures, image processing methods according to example embodiments convert a source image (e.g., a color image, grayscale image, etc.) into an input image by transforming the source image into a 1-bit per pixel image. In other words, the source image is converted to an input image so that each pixel in the input image has one of two states (or colors). For example, each pixel in the input image has a first state (one of black or white color) or a second state (the other one of black or white color). Image processing methods begin by scanning the input image (e.g., in a raster fashion) for a pixel "hit." In at least one example embodiment, a pixel hit occurs when a pixel has the first state (e.g., black) and a pixel miss occurs when a pixel has the second state (e.g., white).

With reference again to FIGS. 4A to 4D, each of the keys is unique and represents a number of possible states that surround a reference pixel RP. The reference pixel RP corresponds to a pixel that is determined to be a pixel hit during the above-described scanning process. Image processing methods according to example embodiments then determine pixel states of pixels in the Moore neighborhood of the reference pixel RP to see which pixels have states that match the state of the reference pixel RP (where the Moore neighborhood refers to the eight pixels immediately adjacent to the reference pixel RP). For example, with reference to the pixel grid in FIG. 4A, the pixels in the Moore neighborhood of the reference pixel RP are examined one-by-one beginning at pixel 0 and continuing in a counterclockwise (CCW) direction to pixel 7. Here, it should be appreciated that the pixel grid of FIG. 4A applies to each key in FIGS. 4A to 4D, and each pixel 0 to 7 in the Moore neighborhood of the reference pixel RP has one of two states (e.g., white or black). Because each of the eight pixels in the Moore neighborhood of the reference pixel RP has one of two states, there are 256 (or 2$^8$) possible combinations of pixel states for the eight pixels in the Moore neighborhood of the reference pixel RP. Thus, there are 256 possible keys (i.e., key 000 to key 255). Key 000 illustrates a scenario where none of the pixels surrounding the reference pixel RP have the same state, key 255 illustrates a scenario where all of the pixels surrounding the reference pixel RP have the same state, and keys 001 to 254 illustrate all scenarios in between.

As discussed in more detail below, each key also includes one or more edges (indicated with arrows) that span one or more sides of one or more pixels in the respective key, and the one or more edges in each key are used to build polygons for the output image and/or polygon profile. The starting point, direction, and ending point of each edge depend on pixel states between adjacent pixels in the Moore neighborhood of the reference pixel RP.

For example, starting at pixel 0 of the pixel grid for each key 001 to 254 and moving in the CCW direction, an edge's tail is initiated at an edge of the pixel grid of a key when a pixel hit is followed by a pixel miss (where pixel hits are shown in FIGS. 4A to 4D as being shaded and pixel misses are not shaded), and travels around borders of pixels with states that match the state of the reference pixel RP so that the edge's head is also located at one of the edges of the pixel grid. Using key 005 as an example, this key corresponds to a portion of an input image where the reference pixel RP and pixels 0 and 2 have a same state (e.g., the color black) in the 1-bit per pixel input image. For key 005, a tail of a first edge begins at an upper left corner or point of pixel 0 and an upper right corner or point of pixel 1 because, in the Moore neighborhood of the reference pixel RP, pixel 0 is a pixel hit and pixel 1 is a pixel miss. The first edge follows the borders of pixels 0, RP, and 2, and ends at an upper righthand corner or point of pixel 2 with the edge's head. In addition, key 005 illustrates a second edge initiated between pixels 2 and 3 of the pixel grid that travels along the bottom borders of pixels 2, RP, and 0.

In FIGS. 4A to 4D, each edge for each key should flow in the same direction as the examination of the Moore neighborhood, in this case, the CCW direction. In addition, each edge of each key "walls off" or separates pixels having the same state as the reference pixel RP from pixels not having that state. FIGS. 4A to 4D further illustrate dots in the center of the reference pixel RP and/or one or more pixels surrounding the reference pixel RP. For keys 001 to 254, the number of dots included in the pixels surrounding the reference pixel RP corresponds to a number of edges for that key. Each dot in the surrounding pixels is placed in a pixel where a head of an edge is located.

As noted above, example embodiments form an input image of any bit depth using known technology to transform the n-bit per pixel image to a 1-bit per pixel input image. For example, a source image is converted to grayscale (if the conversion is needed) and the 1-bit per pixel space is formed by thresholding each pixel value in the grayscale image against a reference pixel value (e.g., by making pixels less than <50% brightness black and pixels>=50% brightness white). Here, it should be appreciated that to the decision process a hit pixel as black and a pixel miss as white is a design choice, and that a pixel hit may be a white pixel and a pixel miss may be a black pixel if desired. In addition, the reference pixel value is a design parameter set based on empirical evidence and/or preference. In at least one example embodiment, the above and below described image processing algorithms (e.g., the methods in FIGS. 5 and 6A) may be run multiple times for a single source image, with each iteration of the algorithm using a different reference pixel value to produce a different 1-bit per pixel input image. The result may produce a plurality of outputs (e.g., complete polygon profiles) that can be compiled into a single composite output (e.g., a single composite polygon profile) or remain separate as a plurality of outputs (e.g., multiple separate polygon profiles). In at least one example embodiment, one or more algorithms may be applied to the plurality of outputs to derive additional information. For example, a polygon profile of an input image may be input to a neural network to produce one or more outputs that are indicative of additional information in the input image. In at least one example embodiment, such additional information may relate to object recognition and/or labeling of one or more objects in the input image.

In view of the above, each reference pixel RP has a key that uniquely identifies the state of the pixels surrounding the reference pixel RP. Example embodiments include generating the keys shown in FIGS. 4A to 4D and storing the keys for later consultation to build polygons for an output image and/or a polygon profile. For example, each key is formed by starting from the upper right-hand corner of the pixel grid and going CCW to fill each key from right to left (where white is a pixel miss o and black is a pixel hit). Assuming a white pixel is binary 0 and a black pixel is binary 1, key 50 is 00110010 in binary, where pixel 0 of the pixel grid is the least significant bit (LSB) and pixel 7 is the most significant bit (MSB). Each of the remaining permutations has a unique key formed by setting a 0 or 1 for black or white for each bit position 0-7 resulting in 256 possible keys.

Each key in FIGS. 4A to 4D further includes edge information where an edge separates white and black pixels on one side of the 3×3 matrix. FIGS. 4A to 4D, there are two such edges, and the edges have two properties: the points that describe the edge, and the link points. For both properties, the ordering of the points may be useful. For key 50 in FIG. 4A, a first edge includes four edge points (0, −1), (0, 0), (0, 1), (−1, 1), and two link points in(0, −1), out(−1, 1). Key 50 includes a second edge with four edge points (1, 2), (1, 1), (1, 0), (1, −1), and two link points=in(0, 1), out(0, −1). As may be appreciated and with reference to the pixel grid, an in-link point of an edge corresponds to the point coordinates of a tail of the edge and an out-link point corresponds to the point coordinates of a head of the edge. In FIGS. 4A to 4D, order the edges by the edge's in link index (i.e., the location of the pixel in the Moore neighborhood of the reference pixel RP). In this case, the first edge is in position 1 of the pixel grid and the second edge is in position 5 of the pixel grid, so the first edge precedes the second edge.

As shown, edge information is computed for all of the keys. The keys are stored as a lookup table (LUT) or in another suitable format. The set of keys represent all adjacency possibilities surrounding a reference pixel RP. Equivalently, no adjacency configuration outside this set of keys is possible. Notably, all pixel information is preserved, meaning that the image processing methods does not round or truncate pixels of an input image. In addition, every edge (or vector from edge in to edge out) is net counterclockwise relative to the center oriented as illustrated by the arrows. All dots other than the dot of the reference pixel RP represent the outgoing link points for a particular edge or arrow. Key 255 represents a solid area of pixels with no edges, and key 000 represents a single pixel with no surrounding pixels. As may be appreciated, every key, except for keys 000 and 255, has at least one non-trivial edge. Each non-trivial edge has two points. When one projects any key sequence [1 . . . 254] to a directed graph (where each key is a node and each edge is a graph edge), then every node has equal out and in degrees. Therefore, by Euler's Theorem, a traversal along any edge will result in a closed polygon. This allows image processing methods to produce closed polygons.

As may be further appreciated, keys 85 and 170 represent maximal connectors (i.e., elements with the most edges, or the most arrows) of 4. That is, the number of edges per key ranges from 0 to 4. Each edge is ordered counterclockwise from the upper left corner, every edge, except in key 255, has at least three points, and every edge, except in keys 0 and 255, connects to every other edge. The description below makes reference to solid points, where a solid point is a point or pixel in a key that is not adjacent to an edge. For example, key 223 has five solid points (coordinate points or pixels 7,0,1,2,3) and key 216 has zero solid points.

In example embodiments, pixel link ambiguities are resolved by the edge point sequence. For example, referring to the coordinate points of the pixel grid in key 005, both edges share points (1, 0) and (0, 0) where the points are referred to in (column, row) format. Also, the two edges share link points: (1, −1), (1, −1). Despite the point equivalence, the sequence of the red and blue edges distinguishes the "sense" of the point and thereby disambiguates the shared reference. This is a unique feature of image processing methods according to example embodiments that affords improved deciding power over algorithms that treat pixels as isolated entities.

Edges can be constructed counterclockwise (as is the convention in FIGS. 4A to 4D) or clockwise by reversing the direction of the arrows on all the edges. Each complete orientation set is functionally equivalent and valid. The total number of edges in a complete set of keys 000 to 255 is 513. Each edge can be in one of two directions (CCW or CW). Of the 2513 possible ways to orient the arrows in FIGS. 4A to 4D, only two combinations (all CW or all CCW) will result in polygon creation. This means the ratio between an edge set that guarantees polygon (correct) and not (incorrect) is $1:2^{512}$ ($1:1.34 \times 10^{154}$). This is a unique fingerprint of image processing methods according to example embodiments.

Figure 4A:
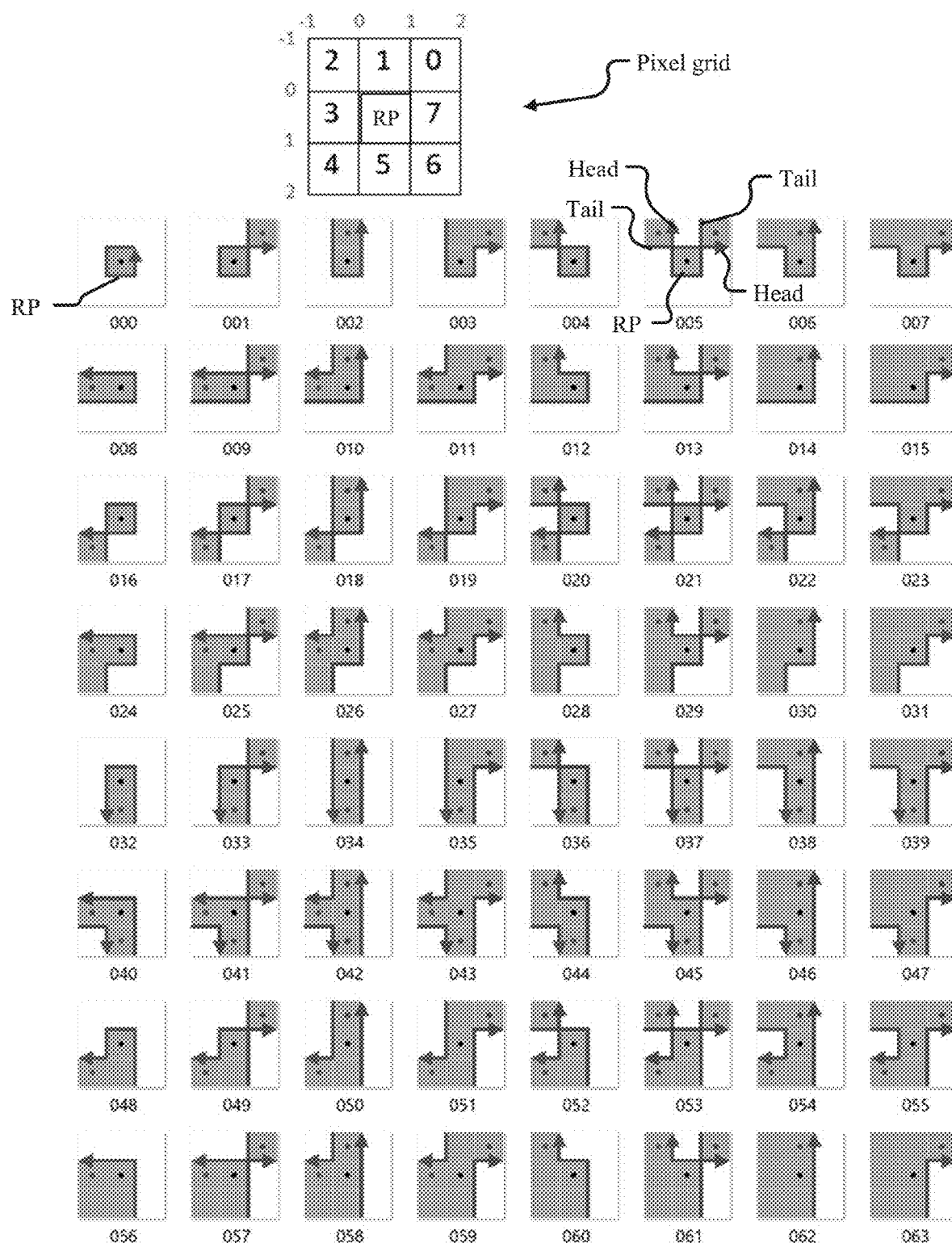
FIGS. 4A to 4D illustrate a plurality of keys according to at least one example embodiment.
Figure 4B:
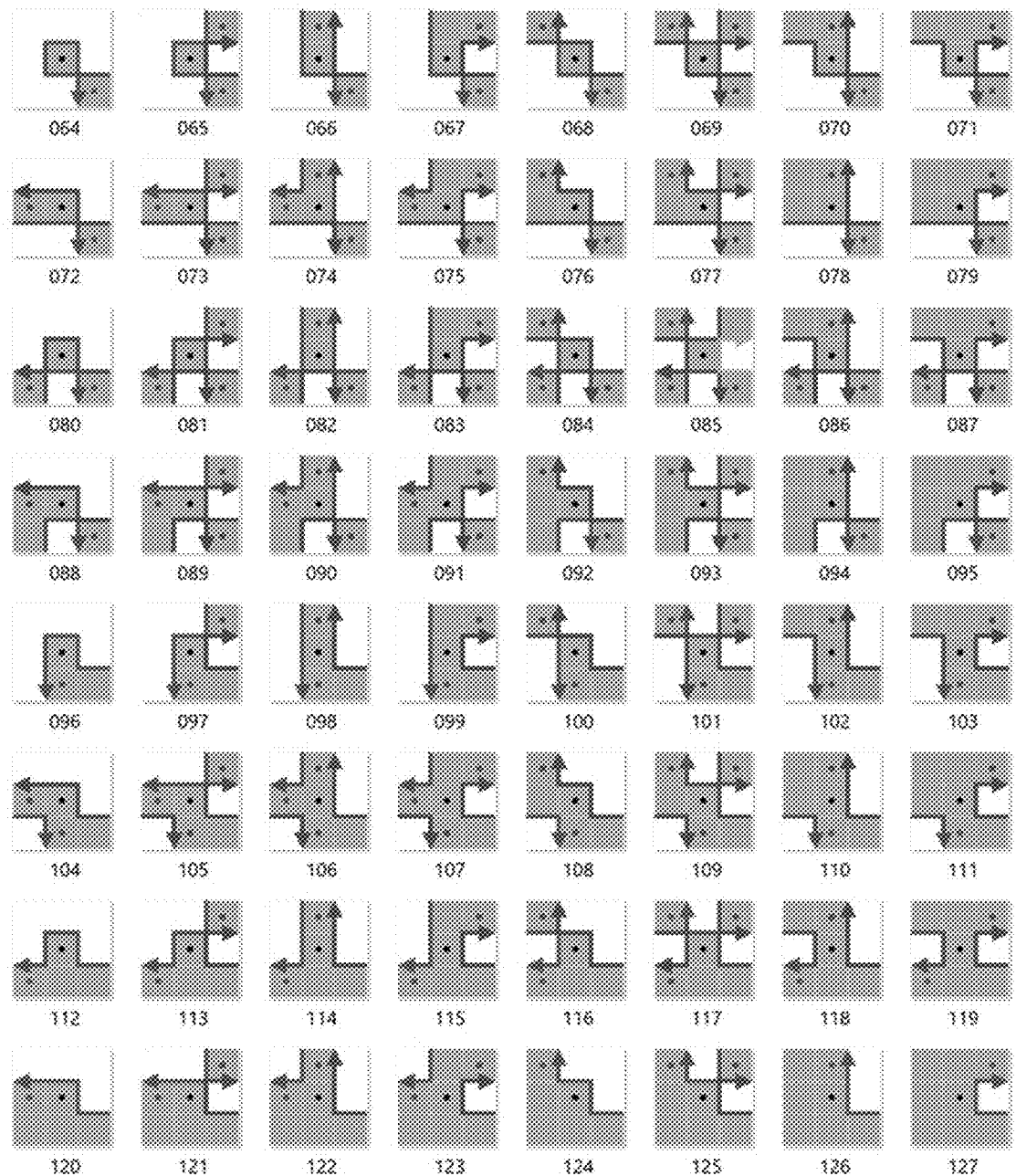
Figure 4C:
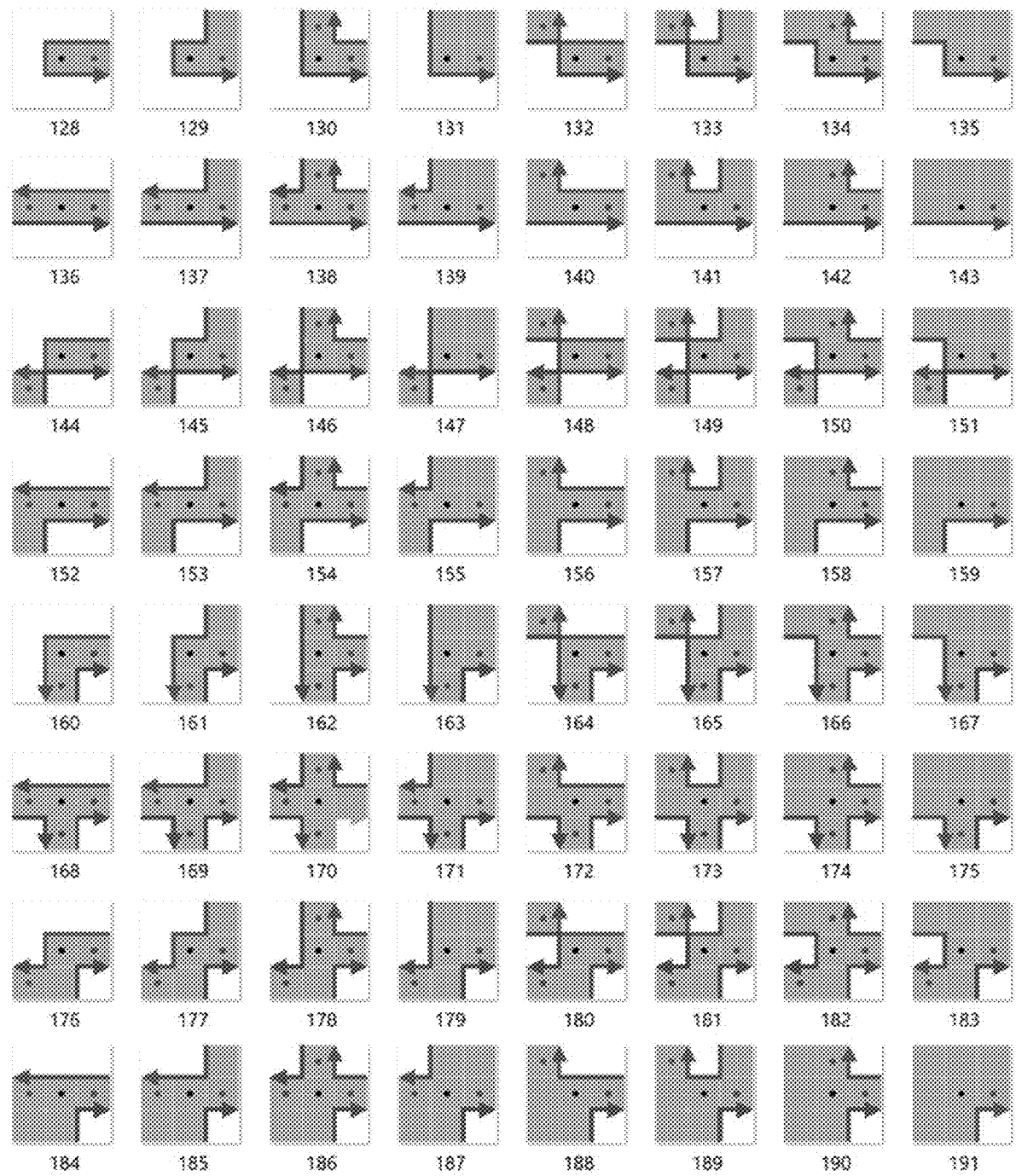
Figure 4D:
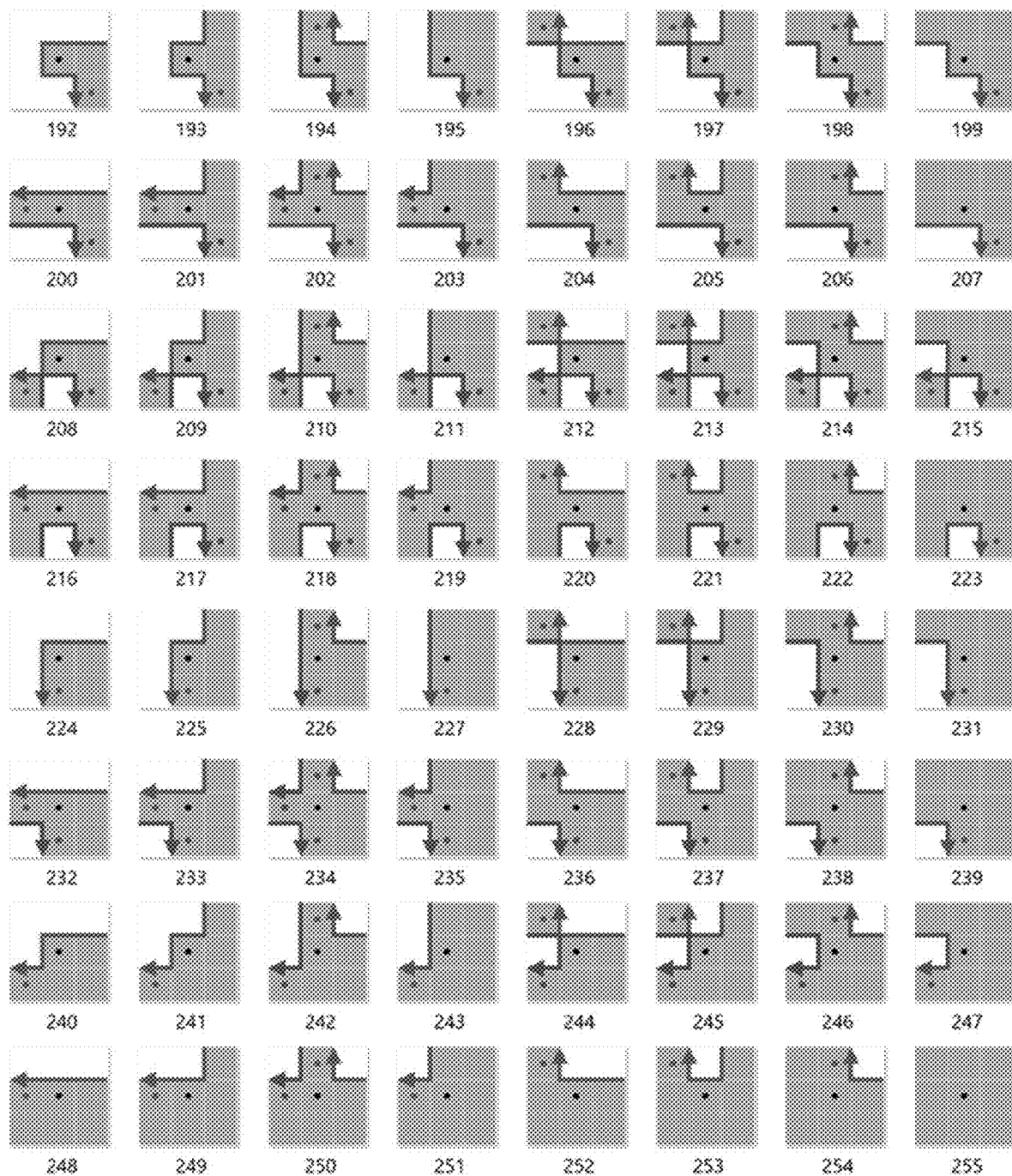

Each key in FIGS. 4A to 4D is formed from a natural key that assumes that the examination of the Moore neighborhood begins at the upper right pixel. A natural key is a key that maps one-to-one to a byte of information (or eight pixels worth of information) in the 1-bit per pixel input image. In other words, the pixel grid in FIG. 4A is considered a natural key because the states of each pixel in the Moore neighborhood of the reference pixel RP correspond to the binary value of the key's number. For example, beginning at pixel 0 of the pixel grid and moving CCW, the states of each pixel for key 050 are 0, 1, 0, 0, 1, 1, 0, 0. Assuming pixel 0 is the LSB and pixel 7 is the MSB in a binary sequence formed from these states, the binary value of 00110010 corresponds decimal 50 (i.e., key 050). This is true for each in that the pixel states of each key correspond to a binary number that in turn corresponds to a decimal number of the key.

Alternate natural key designations may be formed by permuting the pixel grid in FIG. 4A. In total, 18 combinations are fundamentally equivalent: begin numbering the Moore neighborhood of the reference pixel RP by placing '0' in one of the boxes that is not the reference pixel RP (nine possibilities), and number the remaining boxes in a clockwise (CW) or CCW direction (two possibilities) to arrive at a total of 18 equivalent natural keys. Other ad hoc mappings can also map each of the 256 possibilities to a unique number (but may be less efficient than using one of the above described natural keys because another lookup stage (and 256 key memory map) may be needed to connect the ad hoc code to its natural key).

As discussed in more detail below, a 1-bit per pixel input image is processed by referencing the keys in FIGS. 4A to 4D.

Figure 5:
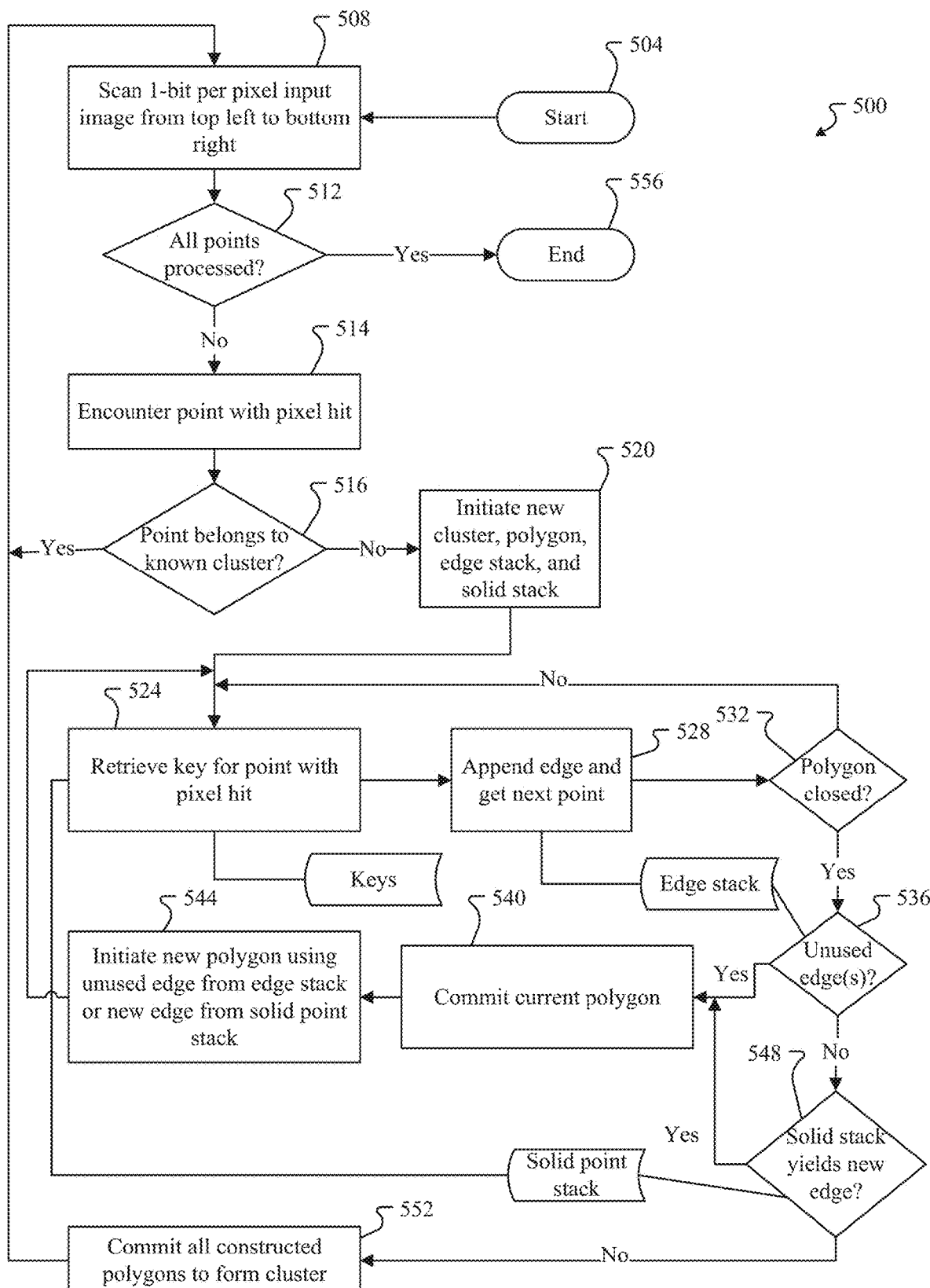
FIG. 5 illustrates an image processing method according to at least one example embodiment.

FIG. 5 illustrates an image processing method according to at least one example embodiment.

The method 500 begins at operation 504 and ends at operation 556. The method 500 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 500. The at least one processor may perform the method 500 by executing instructions stored in a memory such as the memory 120. The instructions may correspond to one or more stages of the method 500 described below. The instructions may cause the processor to execute one or more algorithms, such as an image processing algorithm as described in more detail below.

In general, an image processing method according to inventive concepts begins by scanning for the start of an edge, creating a cluster (e.g., a cluster of one or more polygons) upon encountering a pixel hit, and adding edges to the polygon until a complete polygon is formed (i.e., until the polygon closes). A cluster may be comprised of one or more polygons that are interrelated, for example, as an outer polygon and one or more inner polygons. As discussed in more detail below each polygon may fully define a cluster or combine with one or more other polygons to fully define a cluster. During processing, the method may store information regarding the locations of unconsumed or unprocessed edges to an "edge-stack" in a memory (e.g., memory 120). If any edge in the edge-stack is not consumed by prior polygon, the method initiates a new polygon and adds edges until the polygon closes. This process may be repeated for all edges in the edge-stack. In addition, if the method encounters any solid points during the analysis, the method stores the solid points (e.g., in memory 120) and processes the solid points to see if any solid points are adjacent to a new or not yet identified edge. If so, the method creates a new polygon with the solid point adjacent to a new edge and adds edges until the polygon closes. If all edges in the edge stack are consumed, the method commits the polygon and scans for a new cluster. Upon encountering a new cluster, the above stages are repeated to form another polygon(s) that defines the new cluster. This process is iterated until the input image is fully processed. These operations are described in more detail below with reference to FIG. 5.

Operation 508 includes scanning a 1-bit per pixel input image. For example, operation 508 performs a raster scan of the input image that begins at a first row of pixels in a top left of the input image, proceeds across the first row of pixels of the input image to a top right of the input image, moves to a second row at the left of the input image to scan the second row moving left right, and so on before ending at the bottom right of the input image. However, example embodiments are not limited thereto, and other scanning directions are possible. For example, operation 508 may perform a raster style scan of the input image in any of eight scan directions: in a horizontal direction with any combination of left to right, right to left, top to bottom or bottom to top (four scan directions); or in a vertical direction with any combination of left to right, right to left, top to bottom or bottom to top (another four scan directions).

Operation 512 determines whether all points in the input image have been processed. The points may refer to corners of pixels in the input image (see the pixel grid in FIG. 4A with points having coordinates that range from (−1, −1) to (2, 2), for example). As the method 500 processes the input image, processed points are marked so that operation 512 can determine whether all points have been processed. Each process point may be marked in accordance with a coordinate system mapped to every point of the input image. An unprocessed point is a point that the method 500 has not been encountered and marked during any iteration of the operations described below. Processed points may be marked by flagging that the point is processed and storing the flag in memory 120. If all image points have been processed, the method 500 ends at operation 556. If not, the method 500 proceeds to operation 514.

Operation 514 includes encountering a point in the input image with a pixel hit. For example, the 1-bit per pixel input image is scanned until encountering a point of a pixel that has a state that was set to be the state that indicates a pixel hit.

In operation 516, the method 500 determines whether the point with the pixel hit belongs to a known cluster, for example, an existing cluster in the input image already constructed or being constructed by iterating through the below described operations of FIGS. 5 to 6B. If so, the method 500 returns to operation 508 to continue scanning the input image. If not, the method proceeds to operation 520. A point may be known to belong to a known polygon by determining whether the point has been marked in the manner described above.

Operation 520 includes initiating a new cluster, a new polygon that will belong to the new cluster, a new edge stack, and a new solid stack. As discussed above and in more detail below, the edge stack is a collection of edges stored for the method 500 and the solid point stack (or solid stack) is a collection of solid points stored for the method 500.

Operation 524 includes obtaining edge information for the point identified in operations 512 and 516. For example, operation 524 includes examining the Moore neighborhood of a reference pixel RP (e.g., a pixel hit) including the point to compute and retrieve a key from FIGS. 4A to 4D. Edge information (with the edges indicated with arrows) is obtained from the key and stored as an edge information set to begin building a new polygon. If the key contains any solid points, these solid points are stored to the solid stack for later examination. A solid point is a point or pixel in a key that is not adjacent to an edge.

Operation 528 includes appending a new edge in the direction indicated by the edge of the key (indicated by the head of the arrow) and determining a next point in the polygon (all keys have edges except for key 255). Any unused or unconsumed edges of a key are stored to the edge stack. Operation 528 is discussed in more detail below with reference to FIGS. 6A and 6B.

Operation 532 includes determining whether the polygon loop has closed for the polygon initiated in operation 520. If not, the method 500 proceeds back to operation 524. If so, the method proceeds to operation 536.

Operation 536 includes determining whether there are any unused edges in the edge stack. If so, the method 500 proceeds to operation 540. If not, the method 500 proceeds to operation 548.

Operation 540 includes committing the current polygon, which may include storing the current polygon for inclusion in the output image and/or the polygon profile once all polygons in the input image are constructed.

If operation 536 determines that there were unused edges in the edge stack, the unused edge or unused edges may indicate the existence of another polygon in proximity to the current polygon. Thus, operation 544 includes initiating a new polygon using an unused edge from the edge stack. Starting a new polygon with an unused edge from the edge stack may include retrieving a key for a pixel at the tail of the unused edge. The method 500 then returns to operation 524 to begin building the new polygon by iterating through operations 524, 528, 532, and 536. If there were no edges in the edge stack, the method 500 skips operation 536.

Operation 548 includes determining whether a solid point in the solid point stack formed in operation 524 yields a new edge. If so, the method 500 proceeds to operations 540 and 544 to commit the current polygon and begin a new polygon with the new edge by retrieving a key for a pixel at the tail of the new edge. If not, the method 500 proceeds to operation 552 to commit any polygons formed by iterating through operations 524 to 548 which forms a complete cluster defined by the polygon(s) formed by iterating through operations 524 to 548. The method 500 then returns to operation 508 to continue scanning the input image. If there are not solid points, the method 500 skips operation 548 and proceeds directly to operation 552.

Figure 6A:
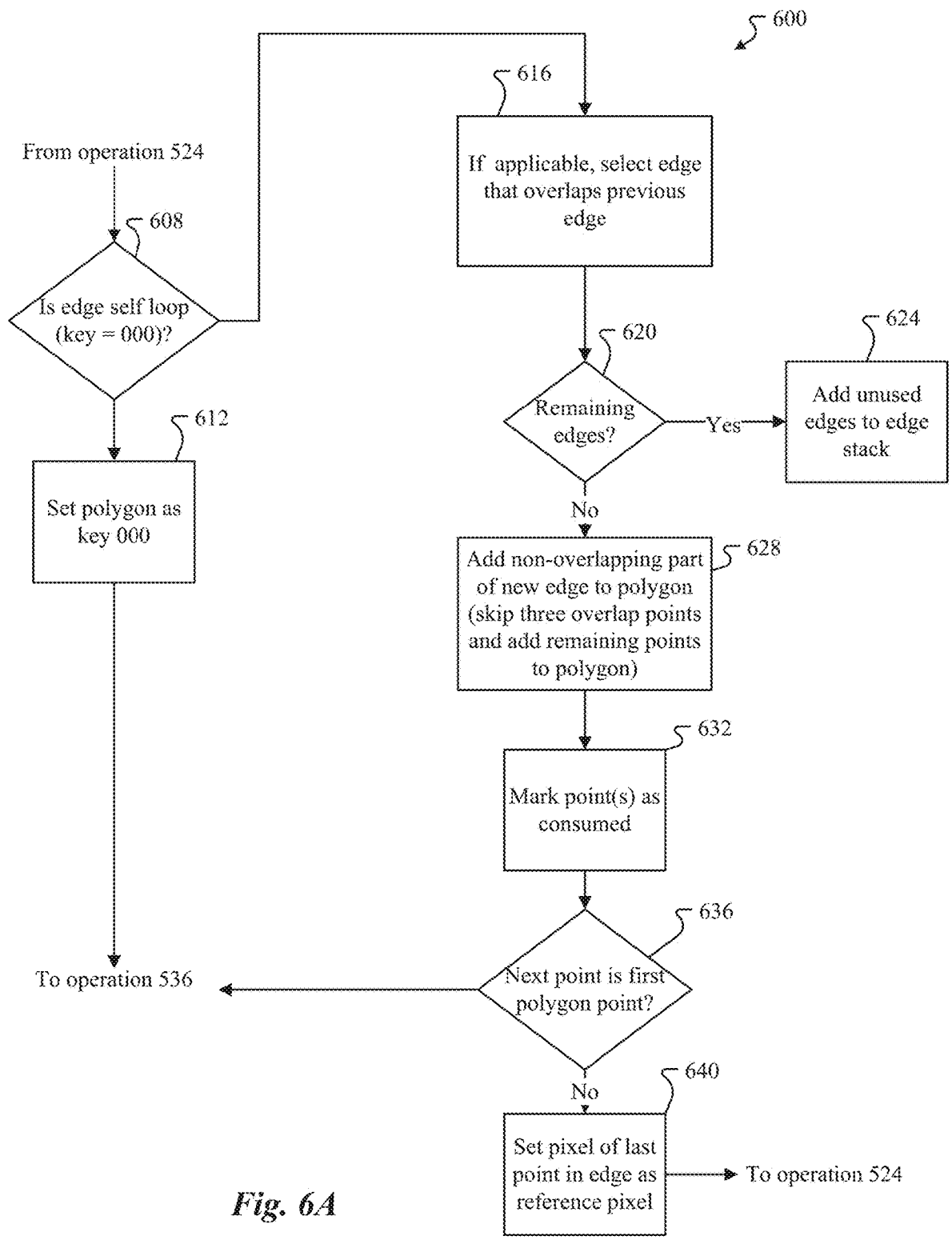
FIGS. 6A and 6B illustrate the image processing method of FIG. 5 in more detail according to at least one example embodiment.
Figure 6B:
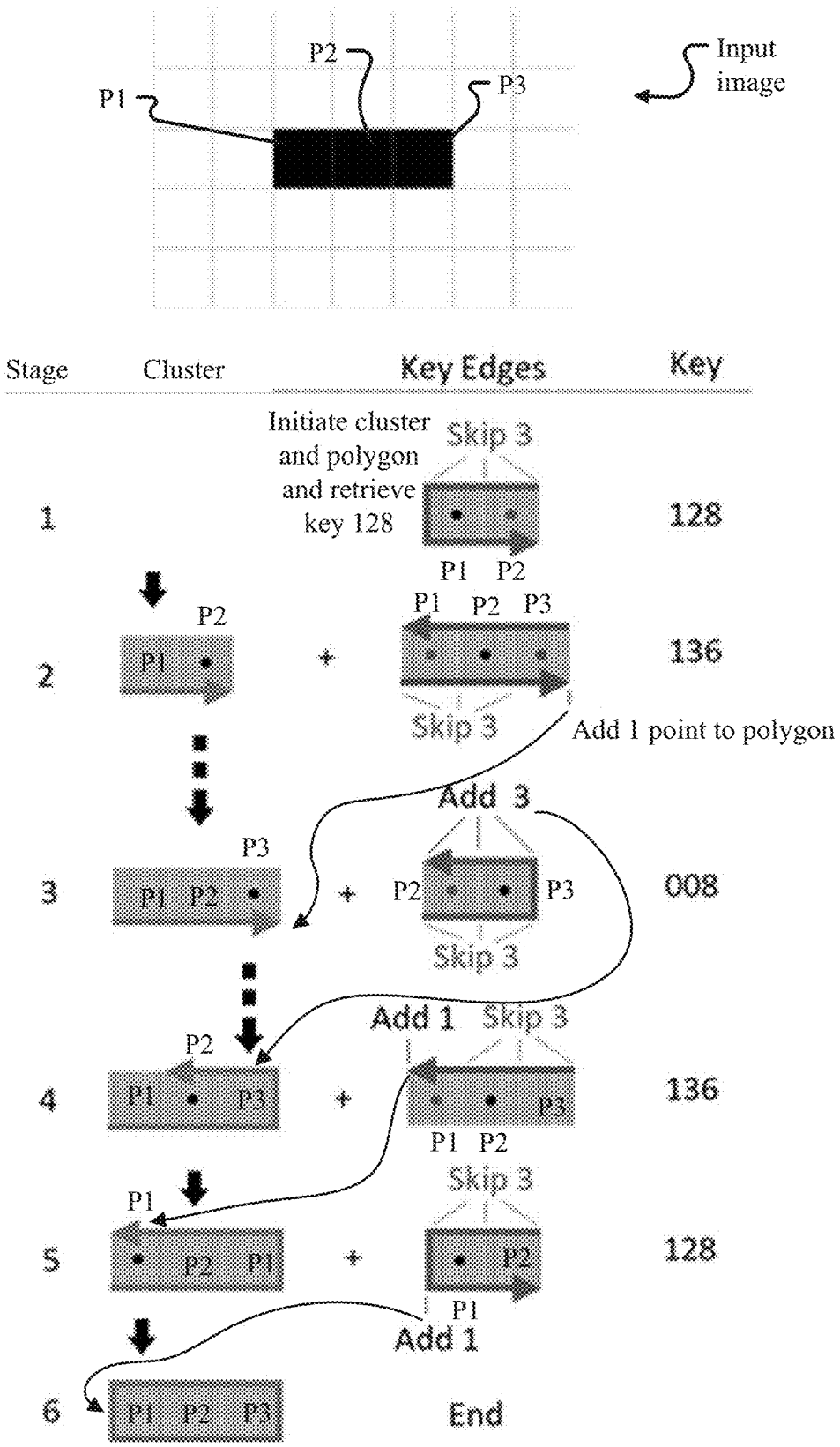

FIGS. 6A and 6B illustrate details for operations from FIG. 5 in more detail according to at least one example embodiment. In more detail, FIG. 6A illustrates a flow chart generic to at least operations 524, 528, and 532 in FIG. 5 while FIG. 6B illustrates a specific example for building a polygon in an input image to produce an output image and/or a polygon profile by following the methods 500 and 600.

The method 600 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 600. The at least one processor may perform the method 600 by executing instructions stored in a memory such as the memory 120. The instructions may correspond to one or more stages of the method 600 described below. The instructions may cause the processor to execute one or more algorithms, such as an image processing algorithm as described in more detail below.

As noted above, operation 524 includes retrieving a key from FIGS. 4A to 4D upon encountering a pixel hit, where the pixel having the pixel hit is used as the reference pixel RP. At this stage, the method 500 may proceed to performing various operations of the method 600, starting at operation 608. The operations of the method 600 may correspond to one or more stages in the example of FIG. 6B, which illustrates the construction of a polygon of an input image having three pixels P1, P2, and P3, where pixel P1 is the pixel hit that initiates a cluster and a polygon that belongs to that cluster.

Here, it should be appreciated that the operations of FIG. 5 may be performed automatically (e.g., with little or no user intervention) once prompted to begin scanning in operation 508.

Operation 608 includes determining whether the retrieved key includes an edge that is a self-loop. If so, the method 600 proceeds to operation 612. If not, the method 600 proceeds to operation 616. The edge being a self-loop is only true for key 000 in FIG. 4A in that the arrow's head ends at the arrow's tail. In all other cases, the method proceeds to operation 616.

Operation 612 includes setting polygon points to edge information points for key 000, which closes the polygon loop (completes the polygon) in operation 648. In other words, operations 608 and 612 determine that there are no pixel hits in the Moore neighborhood of a reference pixel RP, which results in a polygon formed of a single pixel (i.e., the reference pixel RP). Stated another way, operation 612 determines the polygon to be closed with a shape corresponding to key 000. If, on the other hand, operation 608 detects one or more pixel hits in the Moore neighborhood of the reference pixel RP, the method 600 proceeds to operation 616.

Operation 616 includes selecting an edge (e.g., a portion of an edge) of the key retrieved in operation 524 that overlaps part of an edge of the partially constructed polygon. If the method arrives at operation 616 immediately after encountering a first pixel hit of a polygon and the key has more than one edge, then the method 600 may select the first edge of the key that is encountered upon examining the Moore neighborhood of the reference pixel staring at pixel 0 of the pixel grid and moving CCW to pixel 7.

Operation 620 includes determining whether there are remaining edges for the key that were not selected in operation 616. If so, the method 600 proceeds to operation 624 and adds any unused or unselected edges to the edge stack. If not, the method proceeds to operation 628.

In some cases, operations 616 and 620 are skipped, for example, when a key has only one edge. Then, it is not necessary to select an edge or determine whether there are additional edges to store to the edge stack.

Operation 628 includes adding a non-overlapping part of a new edge to the partially constructed polygon by skipping three overlap points and adding any remaining points to the polygon. Three overlap points are skipped at least in part because each edge of a key has at least three points.

Operation 632 includes marking the point(s) skipped and added as used or consumed.

Operation 636 includes determining whether the next point in the currently constructed polygon is the point that started the polygon initiated in operation 520. If not, the method 600 proceeds to operation 640. If so, the method 600 proceeds to operation 536 because the determination of whether polygon loop is closed in operation 532 of FIG. 5 is 'yes', meaning that the polygon is completed and ready for inclusion in the output image and/or the polygon profile.

Operation 640 includes setting a pixel that includes a last point in the edge of the current key as the reference pixel RP. Operation 640 results in moving the initial reference pixel RP to a next pixel in the Moore neighborhood of the initial reference pixel that has a pixel hit. Thereafter, the method 600 proceeds back to operation 524 in FIG. 5 to retrieve a key for the next pixel.

Here, it should be appreciated that the operations of FIG. 6 may be performed automatically (e.g., with little or no user intervention).

As noted above, FIG. 6B illustrates a polygon of an input image having three pixels P1, P2, and P3, where pixel P1 is the pixel hit that initiates a new cluster and a new polygon. FIG. 6B is discussed with reference operations in FIG. 6A for a specific polygon of an input image.

Here, it should be appreciated that stage 1 of FIG. 6B may correspond to operation 524 where a pixel hit for pixel P1 is encountered in the input image and set as the reference pixel RP. Subsequently, the Moore neighborhood of pixel P1 (now the reference pixel RP) is scanned to determine the that the only pixel hit in the Moore neighborhood is pixel P2, which corresponds to key 128. As may be appreciated, key 128 is retrieved because the Moore neighborhood of the reference pixel (i.e., P1) includes a single pixel hit as pixel P2. There is only one edge (arrow) in key 128, so the method begins operating on this edge as described in more detail below. In other words, the determination in operation 608 is 'no,' operation 616 is not applicable, and the determination in operation 620 is 'no,' so the method proceeds to operation 628. However, if key 128 had more than one edge (see key 136), then a different edge may be selected in operation 616 and any unselected edges are stored to the edge stack in operation 624.

As evidenced by stage 1 of FIG. 6B, pixels P1 and P2 correspond to key 128. As shown in stage 1, three points on the edge of key 128 are skipped (where points correspond to corners of pixels identified with "Skip 3" in stage 1) to yield one part of the polygon in stage 2 (operation 628). That is, the three points of key 128 that were not skipped in stage 1 are added as an edge (i.e., the edge of the polygon in stage 2) that forms part of the final polygon. At this stage, key 128 does not include any unexamined or unconsumed edges (because key 128 includes only one edge), and so no edges are stored to the edge stack (the determination in operation 620 is 'no'). Here, it should be appreciated that the first three points of an edge of a key may be skipped for processing every polygon in the input image because this number is useful for set of keys shown in FIGS. 4A to 4D. As may be appreciated by one having ordinary skill in the art, a different set of keys may result in skipping a different number of points in operation 628.

With the Moore neighborhood of pixel P1 now being processed and the edge of the polygon in stage 2 ending at pixel P2, the method proceeds by setting pixel P2 as the reference pixel in stage 2 and examining the Moore neighborhood around pixel P2 to yield key 136 because pixels P1 and P3 are pixel hits in the Moore neighborhood of the current reference pixel P2. As shown, key 136 includes two edges (arrows) as a top edge and a bottom edge.

Stage 2 includes selecting the bottom edge of key 136 because that edge overlaps the edge of the partial polygon in stage 2 and skipping three points of the bottom edge of key 136. The bottom edge of key 136 is selected because this edge overlaps the edge in the partially constructed polygon of stage 2 (operation 616). Skipping three points on the bottom edge of key 136 leaves a single point at pixel P3 that is added to the polygon in stage 3 to extend the edge in the polygon by one point (operation 628). The method then marks all of the points on the bottom edge of key 136 as being used or consumed by the polygon in stage 3 (operation 632). Because key 136 still includes a top edge that was not used or consumed in the transition between stage 2 and stage 3, the top edge of key 136 is saved to the edge stack (the determination in operation 620 is 'yes' and the edge is saved to the edge stack in operation 624). In addition, the transition between stages 2 and 3 sets pixel P3 as the reference pixel (operation 640). At this stage, the method determines that the next point in the polygon (the bottom point of pixel P3) is not the first point from the polygon in stage 2 (the bottom left point of pixel P1), and so the method continues to process the polygon (the determination in operation 636 is 'no' and the method sets pixel P3 as the reference pixel in operation 640 before returning to operation 524 to retrieve an appropriate key for pixel P3 being set as the reference pixel).

At stage 3, the method includes examining the Moore neighborhood of the reference pixel P3 for pixel hits. As shown in the input image, the only pixel hit in the Moore neighborhood of pixel P3 is pixel P2, which corresponds to key 008. Because key 008 only has one edge, operation 616 is not applicable (i.e., skipped) and the determination in operation 620 is 'no.' As in stage 2, the first three points of the edge in key 008 are skipped starting from the tail of the edge, leaving the top three points of key 008 to add to the polygon shown in stage 4 (operation 628). The three points that are skipped and the three points that are added to the polygon are marked as consumed (operation 632). In general, all skipped points in a key and all points added to the final polygon are marked as consumed.

Because the three points added to the polygon in stage 3 causes the polygon's edge to end at pixel P2 in stage 4, pixel P2 is set as the reference pixel in stage 4 (operation 640) and the method returns to operation 524 to retrieve a key of the reference pixel P2. Examining the Moore neighborhood of pixel P2 results in pixel hits at pixels P1 and P3, which corresponds to key 136. However, because the bottom edge of key 136 was marked as consumed in stage 2, only the top edge of key 136 is considered (operation 616 is skipped and the determination in operation 620 is 'no'). As shown, the first three points of the top edge of key 136 are skipped, which leaves a single point that is added to the polygon in stage 5 (operation 628). This single point is marked as consumed (operation 632). The point at which the edge ends in the polygon of stage 5 is not the first point from stage 2, so the determination in operation 636 is 'no.' Now that the edge of the polygon ends at pixel P1, pixel P1 is again set as the reference pixel (operation 640) and the method returns to operation 524 to retrieve the appropriate key.

As shown in stage 5, examining the Moore neighborhood of pixel P1 in operation 524 returns key 128 because pixel P2 is the only pixel hit. Key 128 includes only one edge and so operation 616 is skipped and the determination in operation 620 is 'no.' As shown in stage 5, the first three points of key 128 are skipped, leaving one point to add to the polygon in stage 5 (operation 628). This single point is marked as consumed (operation 632). In addition, this single point is the same point at which the polygon started in stage 2. Thus, the determination in operation 636 is 'yes' and the polygon is set to closed for inclusion in an output image and/or the polygon profile before proceeding back to operation 536.

Now with reference to FIGS. 5 to 6B, once a polygon is determined to be complete in operation 532, the next task in operation 536 is to pop edges off the edge stack (if any) to start creating a new polygon. For example, the method 500 selects a first edge saved to the edge stack in an iteration of the method of FIG. 6 that first resulted in an edge being saved to the edge stack in operation 624 (i.e., the edges saved to the edge stack are processed in a first-in, first-out (FIFO) manner). However, example embodiments are not limited thereto, and an order in which the saved edges are processed (popped off) from the edge stack may be a design parameter set based on empirical evidence and/or preference. An edge saved to the edge stack is considered as a new edge that does not belong to a previously constructed polygon. The method 500 starts proceeds to operations 540 and 544 for the new edge.

In addition, as discussed above, operation 548 determines whether there are any solid points stored to the solid stack. In this case, after all edges have been exhausted from the edge stack, the method 500 iterates through the solid points in the solid stack searching for an edge that does not belong to an already constructed polygon (a new edge). If such a solid point exists, the method 500 proceeds to operations 540 and 544 to initiate a new polygon.

The above-described operations of FIGS. 5 to 6B may be summed up with the following pseudocode:

1. Main(image 1-bit image (each cell is a "hit" or a "miss"))
    1. For each (point in 1-bit image from Top Left to bottom Right)
        1. If (point is miss or point has been processed) continue
        2. ProcessPoint(point)
2. ProcessPoint(point)
    1. Initialize cluster, Polygon, edgeStack, solidStack
    2. Do
        1. edgeInfo = GetEdgeInfoForPoint(point)
            1. point = AppendAndGetNextPoint(edgeInfo)
            2. if (edgeInfo HasAvailableEdge)
                1. push edgeInfo onto edgeStack
        2. if (point is Invalid)
            1. point = GetNextStackPoint( )
    3. While point is valid
    4. Remove all empty Polygons
3. GetEdgeInfoForPoint(point)

```
    1. If point visited return cached EdgeInfo
    2. Scan hits and misses directly surrounding point
    3. Key = Encode per FIGS. 4A to 4D
    4. Get EdgeInfo block corresponding to Key
    5. Add point to cluster
    6. Cache and return EdgeInfo
 4. AppendAndGetNextPoint(edgeInfo)
    1. If Key is 0, add points and done (See key 000 represents)
    2. Materialize edgeInfo and translate to point center
    3. Skip first three points on edge and add remaining points to
       active Polygon
    4. Mark edgeInfo link Point as consumed
    5. Set last link point to this edgeInfo center
 5. GetNextStackPoint( )
    1. while (edgeStack has Any)
       1. edgeInfo = pop edge Stack
       2. if (edgeInfo.HasAvailableEdge( ))
          1. point = edgeInfo.Center;
          2. Close current Polygon and create new one;
          3. return point;
    2. current Polygon = invalid;
    3. if (solidStack has Any)
       1. point = pop solidStack
    4. return point;
```

Figure 7A:
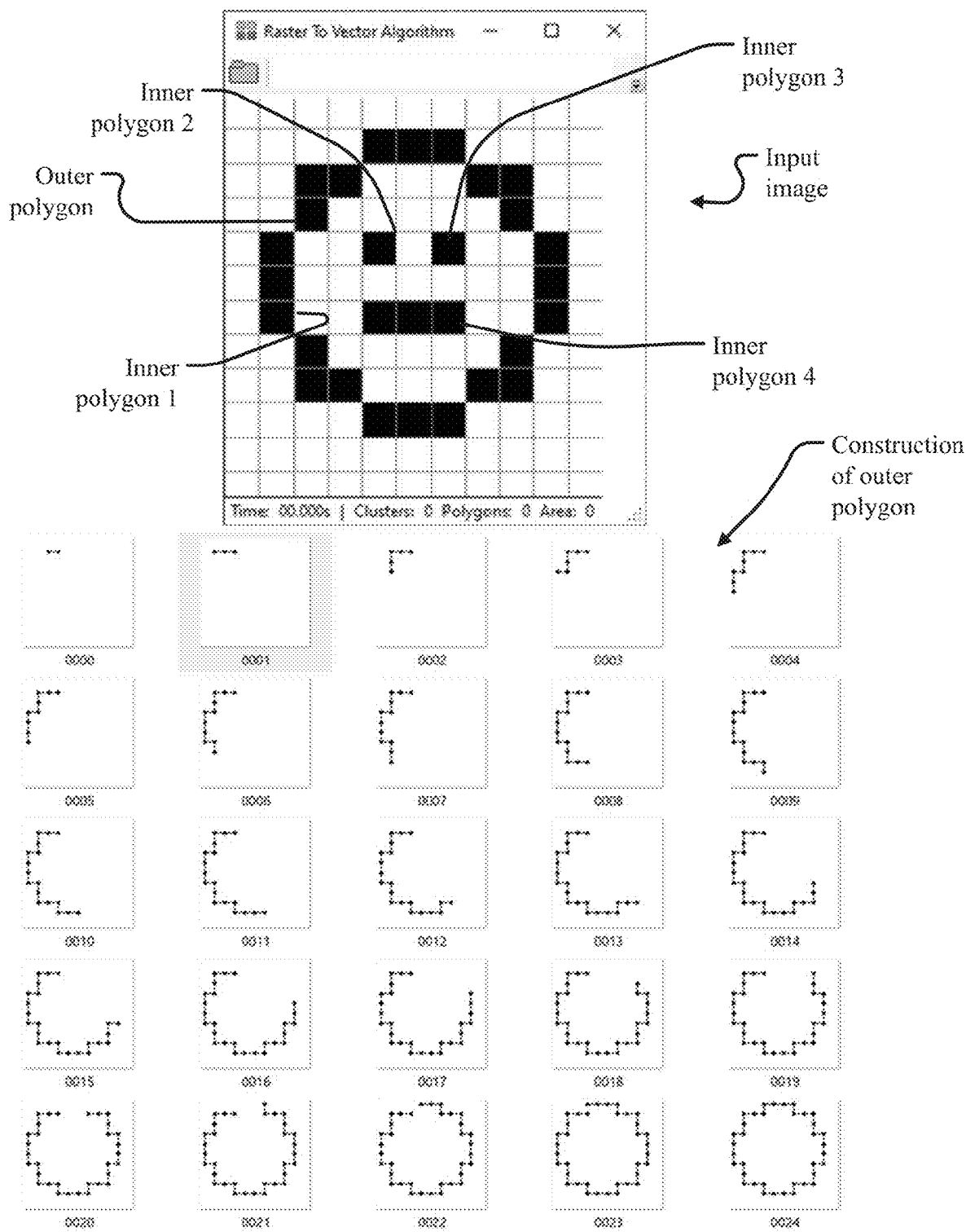
FIGS. 7A and 7B illustrate an example of how image processing methods according to example embodiments construct a series of polygons based on an input image.
Figure 7B:
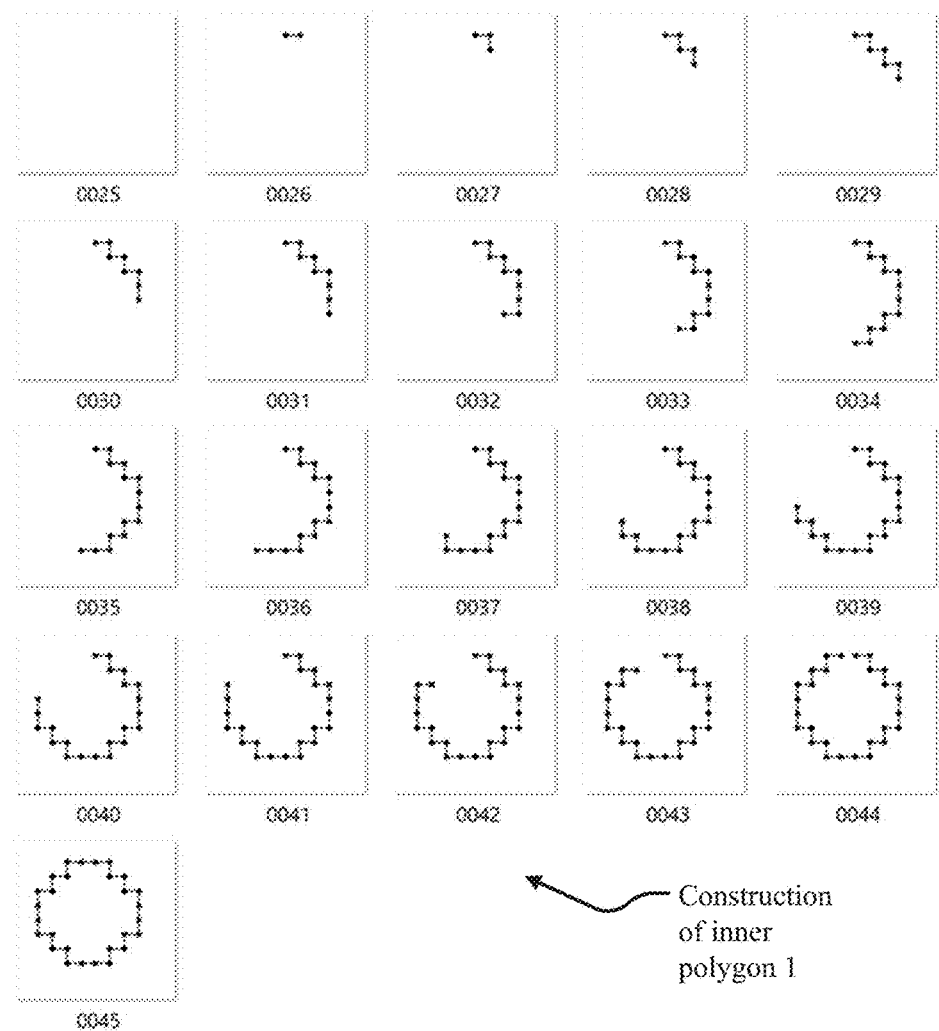
Figure 7B:
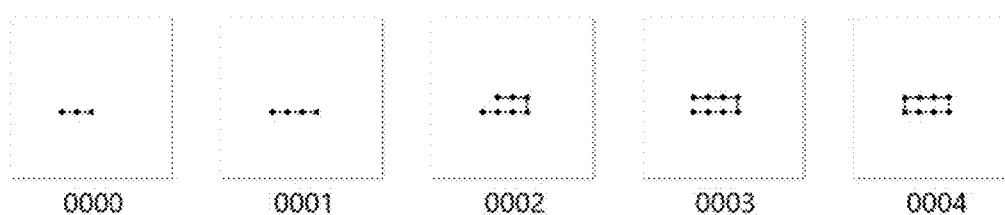

FIGS. 7A and 7B illustrate how image processing methods according to example embodiments construct a series of polygons (e.g., for an output image) based on an input image. FIGS. 7A and 7B may be formed according to the methods described above with reference to FIGS. 1 to 6B.

As shown in FIG. 7A, the input image is a face that includes five total polygons: an outer polygon of the face, an inner polygon 1 of the face, two inner polygons 2 and 3 for the eyes, and an inner polygon 4 for the mouth. As may be appreciated, image processing methods according to example embodiments cause the outer polygon to be formed in a CCW direction and the inner polygons 1 to 4 to be formed in a CW direction. Each dot in FIGS. 7A and 7B represents a point of a pixel on the input image. Construction of polygons 2 and 3 is not shown because the eyes of the face are singular pixels with no pixels in their respective Moore neighborhoods, meaning that each polygon 2 and 3 corresponds to key 000. The example in FIGS. 7A and 7B illustrates a cluster with four distinct groups of pixels defined by polygons, key sequences for each polygon, the polygon orientation (CCW for external polygons and CW for internal polygons), points that get added for each iteration of the loop, and stage sequence and loop terminations.

Figure 8:
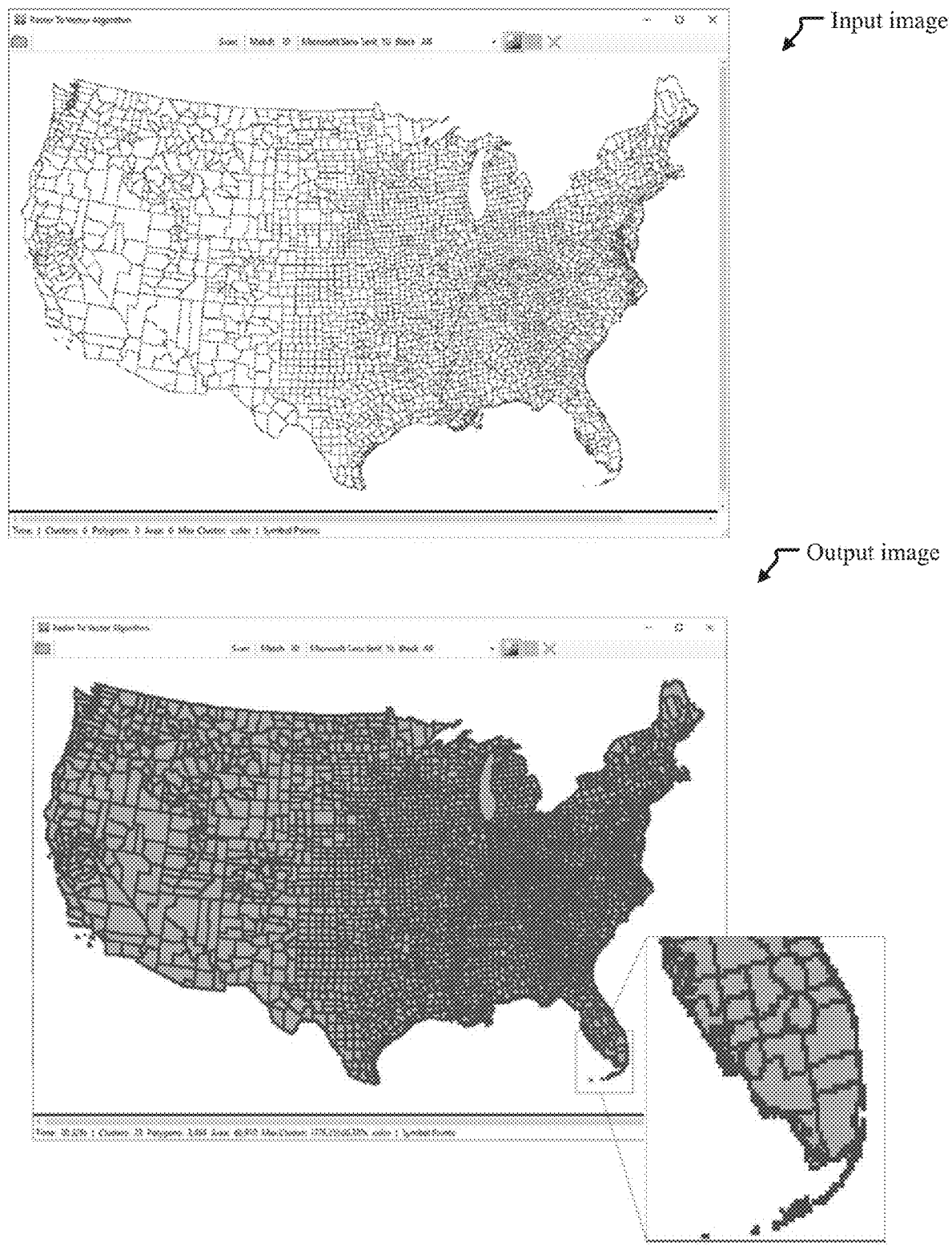
FIG. 8 illustrates another example of how image processing methods according to example embodiments construct a series of polygons based on an input image.

FIG. 8 illustrates example of how image processing methods according to example embodiments construct a series of polygons for (e.g., for an output image) based on a complicated input image. Related art image processing techniques would struggle to correctly identify all the clusters and polygons in the input image of FIG. 8 due to the large number of branches and intersections and possible ambiguous pixel cases that should be deterministically resolved. However, executing image processing methods according to FIGS. 1 to 6B produces an accurate output image and one or more characteristics of the output image in 0.328 s using a standard personal computer. In the output image, the inner and outer shaded areas are the inner and outer polygons bounded by lines. The image processing algorithm described herein correctly identifies 3,454 polygons, 23 clusters, a total pixel area of 60,910 in 0.328 s. Despite the complexity of FIG. 8, no polygon or edge is missed. Zooming in on any region of the output image shows that each polygon was faithfully traced with no rounding error. Furthermore, every run of the algorithm is deterministic over the same image (i.e., over the same image, the algorithm always or almost always produces the same results).

In the example of FIG. 8, the polygons may define county boundaries for the 48 contiguous states in a map of the United States. Although not explicitly illustrated, it should be appreciated that at least some of the usefulness associated with producing the output image in FIG. 8 is through post-processing the output image. For example, given that each county is correctly identified in the output image, the output image may be used in a dashboard or other web-based application that associates data with each county (e.g., demographic data, weather data, and/or any other useful data). A user of such a dashboard may be presented with the option to select or hover a mouse over a particular county to show the relevant data associated with that county. Thus, it may be said that example embodiments relate to accurately processing an input image to produce an output image, where the output image may undergo additional operations to improve the usefulness of the output image.

Figure 9:
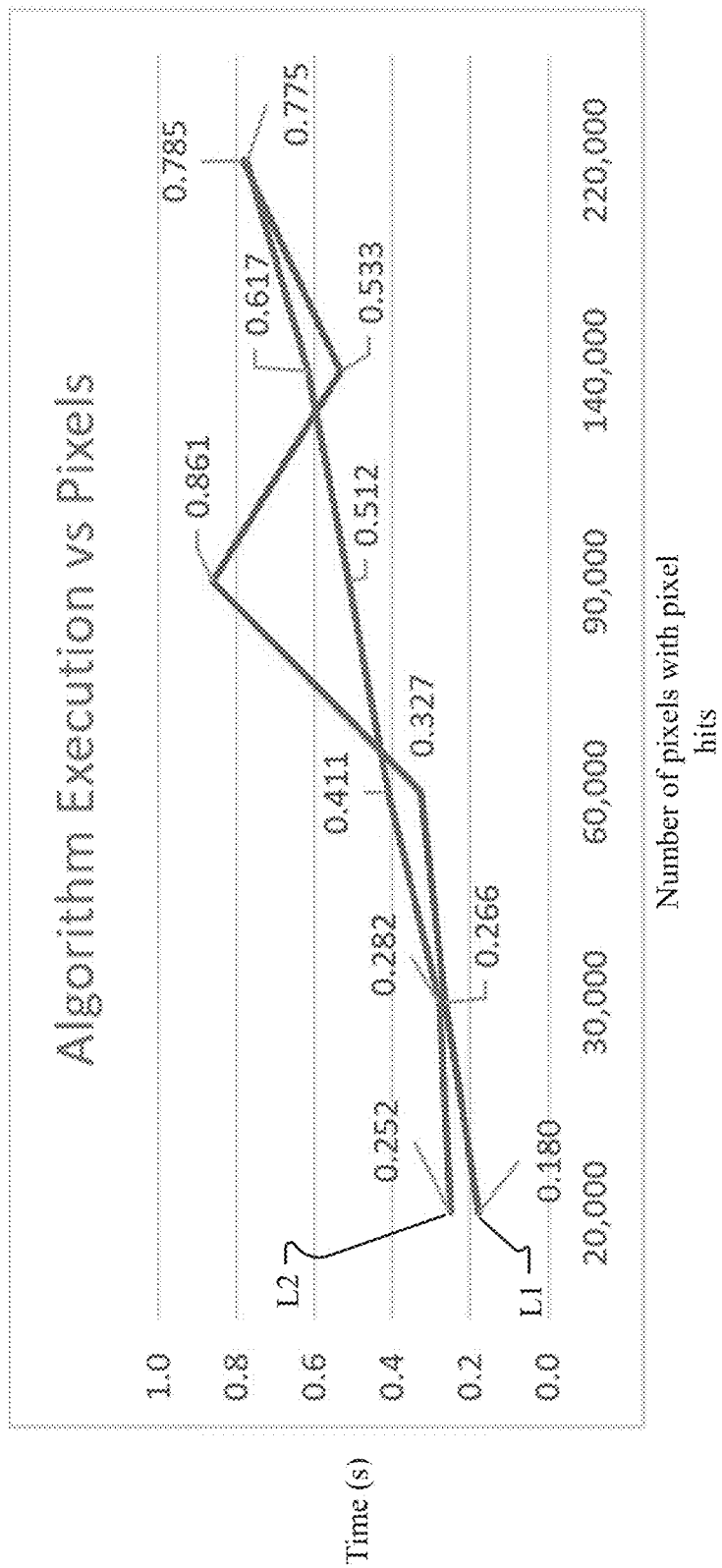
FIG. 9 illustrates a graph showing an amount of time taken for image processing algorithms according to example embodiments versus a number of pixels to be processed.

FIG. 9 illustrates a graph showing an amount of time taken for image processing algorithms according to example embodiments versus a number of pixels to be processed.

The graph in FIG. 9 shows samples of the algorithm performed on various images where the pixel count is the number of pixels with pixel hits (e.g., a number of black pixels in the image on a white background). Line L1 illustrates algorithm runs by pixel count. Line L2 is proportional to the square root of the number of pixels. Logically an algorithm is Edges*O(n)+(SolidPoints+EmptySpace)O($n^2$). Therefore, for a sparse image with thin lines, the algorithm tracks to O(n). As the image's empty space and or solid pixels between the edges increases (i.e., "thick lines"), the algorithm's performance is: O($n^2$).

Figure 10:
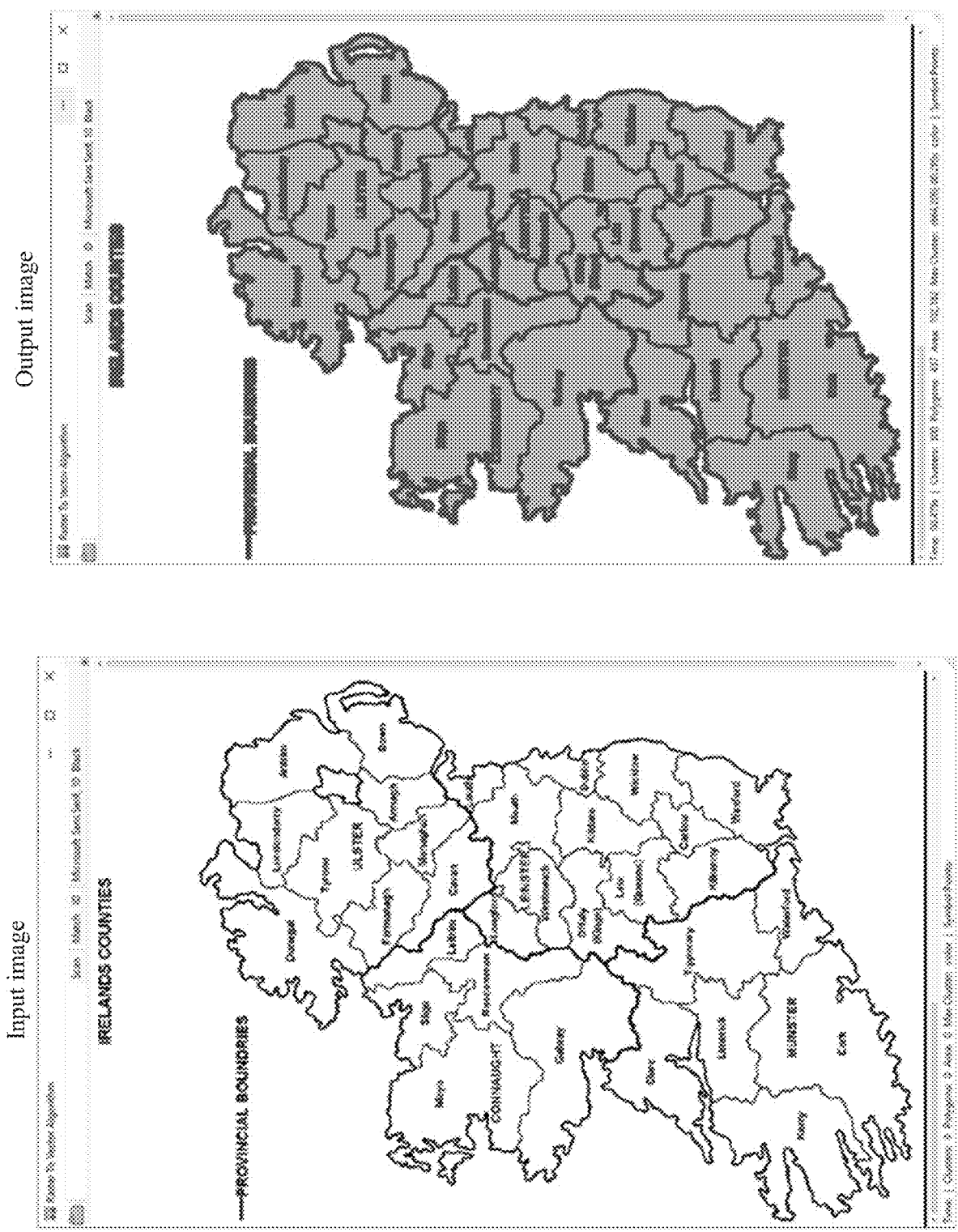
FIG. 10 illustrates another example of how image processing methods according to example embodiments construct a series of polygons based on an input image.

FIG. 10 illustrates example of how image processing methods according to example embodiments construct a series of polygons for an output image based on a complicated input image. In this example, the algorithm correctly identifies 437 polygons (which are composed of provincial bounds and text). All provincial boundaries are correctly traced. Also the position of the text within each boundary is also known because the text characters are also polygons with a known position.

FIGS. 1-10 have been discussed with respect to image processing algorithms that process input images having a white background with black pixels. However, example embodiments work equivalently for the opposite case (i.e., an input image with a black background and white pixels). If the 1-bit bitmap has any contrast, the contrast is used to process the input image. Any suitable bitmap can be used as an input that transforms the space (even adaptively) to a "hit" and "miss" 1-bit bitmap.

For grayscale or color images, the image processing algorithm may use any suitable continuum of hit/miss criteria (e.g., 40%, 50%, 60%, 70% 80% or any other distribution.) Also, for all the hit/miss criteria, the algorithm can be run in parallel as each run would be independent. The resulting polygons for each bit depth may be superimposed to create a consensus polygon contour.

In addition, clockwise conventions and counterclockwise conventions are equivalent. Furthermore, any encoding permutation for the keys of FIGS. 4A to 4D may also result in an equivalent implementation of the algorithm.

In view of the above, it should be appreciated that an image processing algorithm according to example embodiments runs over any 2D image surface and identifies all clusters and polygons. In scanning all pixels in a 2D image, the algorithm is bound to run in a maximum of O(n²). If, however, the user selects a boundary of a cluster, the algorithm may be adapted to trace only that polygon outline. In this mode, the algorithm may run in O(n) time.

Image processing algorithms according to example embodiments may further provide the ability process images other than 2D images. For example, in a hypercube variation, the algorithm for a 2-Cube case (Cartesian plane), scales to n-Cubes. For an n-Cube, the adjacent n-Cubes are $3^n-1$:

1) Each dimension allows choices (−1,0,1) unit travel, by multiplication rule=>$3^n$ 2) (0,0,0) is the center from which no travel occurs=>−1

In the case of a 3-Cube, there are $3^3-1=26$ neighbors. Each neighbor can be a pixel hit or pixel miss. Therefore, the total number of edgeInfo blocks is $2^{3^3-1}=2^{26}=67,108,864$. The general formula for the number of edgeInfo blocks required for an n-Cube is: $2^{3^n-1}$.

The same overview algorithm applies to n-Cubes with the following definitions:
Edge=(n−1)flat
Polygon=n-Flat
Solid=n-Flat In general, the algorithm may scan for the start of an edge, initiating a new cluster and a new polygon for the new cluster, and add edges until polygon closes. This may include adding unconsumed edges on an edge stack. If any edge on an edge stack was not consumed by prior polygon, create a new polygon with the unconsumed edge and add edges until the polygon closes. This may be repeated for all edges on the edge stack. If there were any solid points, process all of those to see if any are adjacent to a new edge. If so, create a new polygon with the new edge and add edges until the new polygon closes. If all edges consumed, commit all polygons as a cluster, scan for a new cluster, and repeat.

For example:
2D: Edge=line (1-Flat), Polygon=plane (2-Flat), Solid=plane (2-Flat)
3D: Edge=plane (2-Flat), Polygon=3D solid (3-Flat), Solid=3D solid (3-Flat)
4D: Edge=3D solid (3-Flat), Polygon=4-Flat, Solid=4-Flat
And so on.

Figure 11:
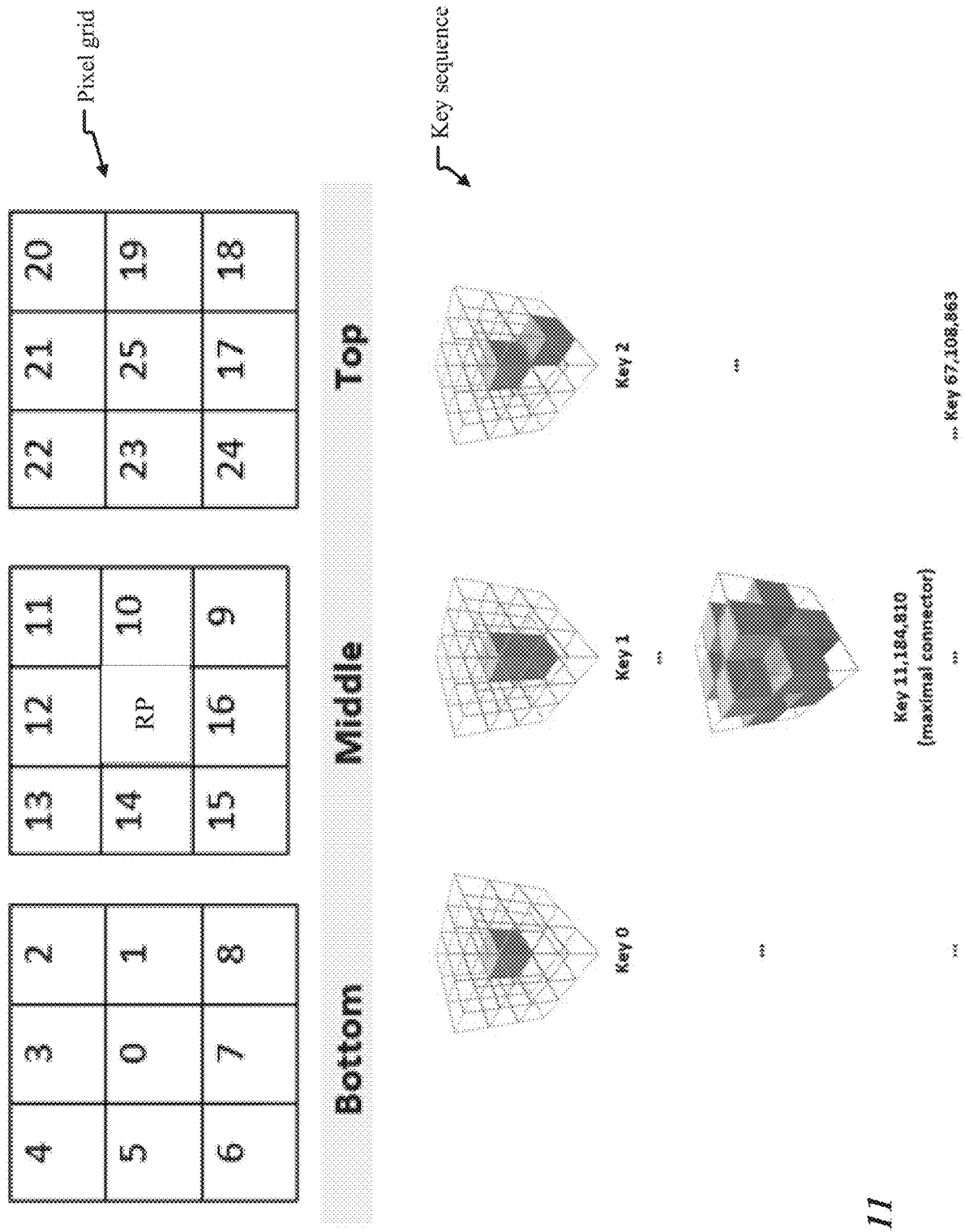
FIG. 11 illustrates a pixel grid and a plurality of keys for a three-dimensional image according to at least one example embodiment.

In a 3D image, for the 26 cubes surrounding the center of a 3-cube, choose a cell address encoding that spirals CCW upward (right-handed system) such as shown in the pixel grid of FIG. 11, which results in the illustrated key sequence (abbreviated for the sake of brevity but constructed in the same manner as the keys in FIGS. 4A to 4D).

Figure 12:
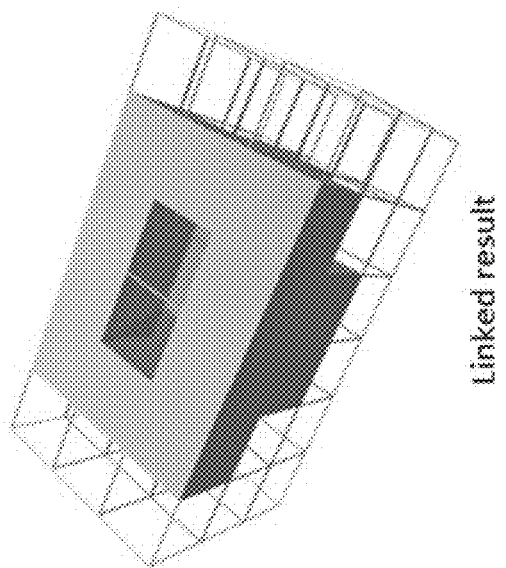
FIG. 12 illustrates building a three-dimensional polygon for a three-dimensional input image according to at least one example embodiment.
Figure 12:
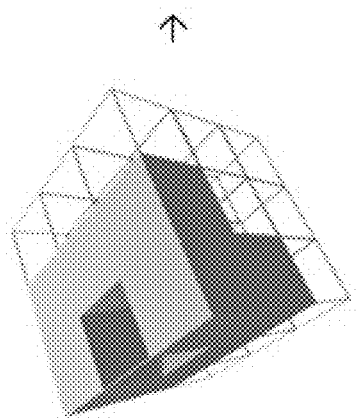
Figure 12:
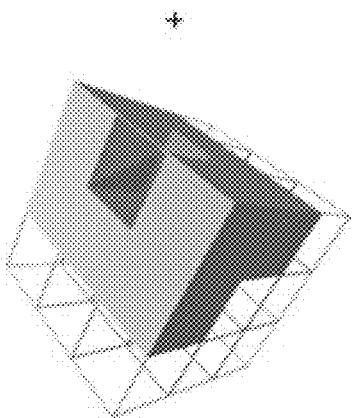

FIG. 12 illustrates combining 3D pieces into growing volumes. In the 2D case described with reference to FIGS. 1 to 10, edge linking forms polygon boundaries. In the 3D case, surface linking forms volume boundaries. Recall that any combination of keys [1 . . . 67,108,862] will result in a complete definition. To illustrate how two arbitrary keys join (analogous to the 2D join procedure) take key 3981 to key 3981 in FIG. 12.

Combining the top "notch" of both keys forms a new volume boundary shown as the rectangular notch on the top of the "Linked result". Every 3D Key (other than the first and last keys) has equal in and out degree as defined by the edge surface. Using the same linking mechanism for processing 2D images (see FIGS. 5 to 6B), the volume boundaries grow and eventually self-close to form completely defined boundaries. By analogy, 3D groups of pixels are volumes of contiguous pixels, and 3D polygons are the surfaces that fully separate all volumes in the 3D space.

Figure 13:
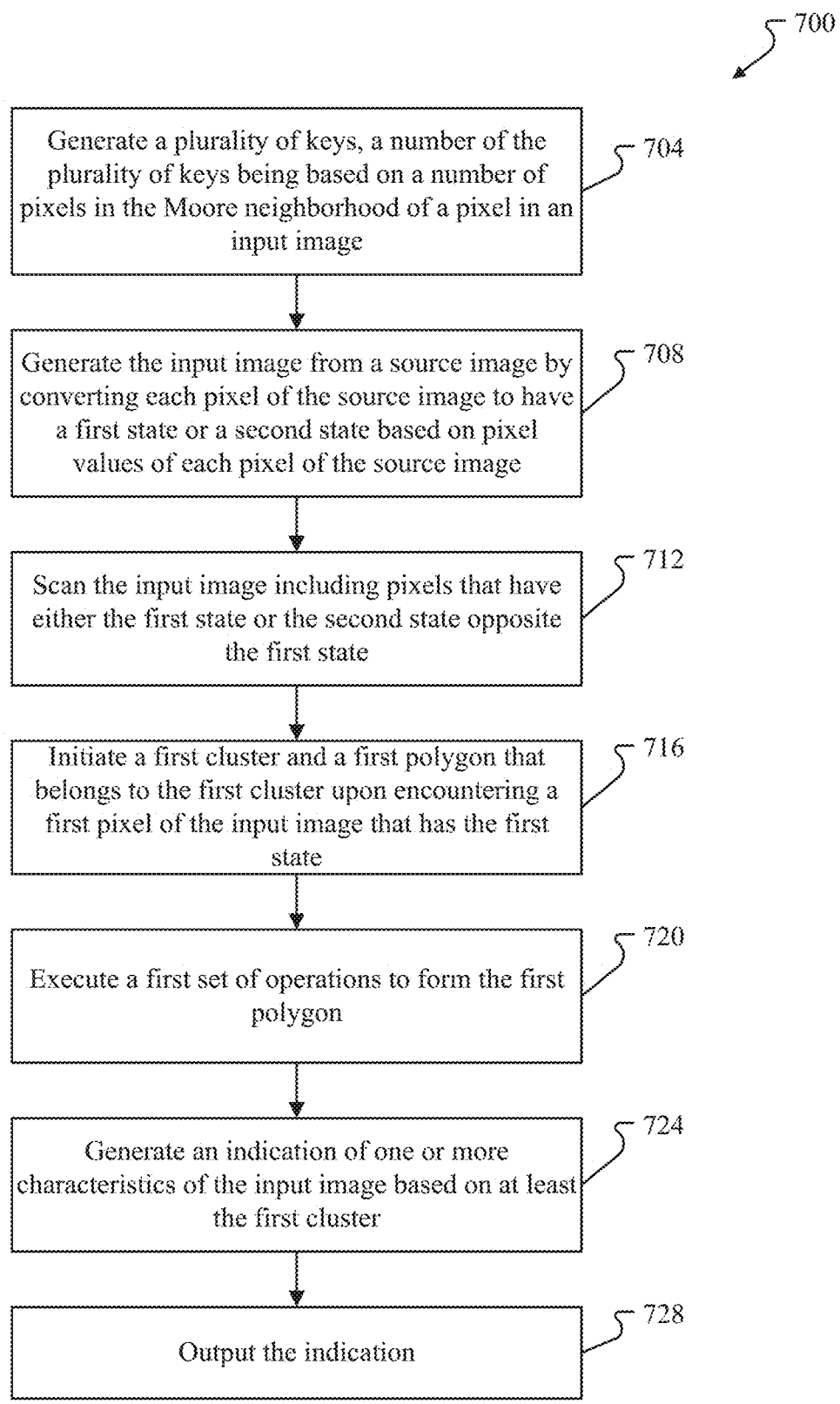
FIG. 13 illustrates a method according to at least one example embodiment.

FIG. 13 illustrates a method 700 according to at least one example embodiment.

The method 700 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 700. The at least one processor may perform the method 700 by executing instructions stored in a memory such as the memory 120. The instructions may correspond to one or more stages of the method 700 described below. The instructions may cause the processor to execute one or more algorithms, such as an image processing algorithm as described in more detail below.

Operation 704 includes generating a plurality of keys shown, where a number of the plurality of keys is based on a number of pixels in the Moore neighborhood of a pixel in an input image to be processed. For example, operation 704 generates the plurality of keys shown in FIGS. 4A to 4D such that each key corresponds to one possible permutation of states of pixels within the Moore neighborhood of a reference pixel RP.

Operation 708 includes generating the input image from a source image by converting each pixel of the source image to have the first state or the second state based on pixel values of each pixel of the source image. As discussed above with reference to FIGS. 1 to 12, if the source image is a color image, the color image may be converted to grayscale according to known techniques. The grayscale image may be subjected to a thresholding process to generate the input image as a 1-bit per pixel image (e.g., each pixel is black or white). In at least one example embodiment, the first state corresponds to black pixel while the second state corresponds to a white pixel. However, in another embodiment, the first state may correspond to a white pixel and the second state may correspond to a black pixel.

Here, it should be appreciated that operations 704 and 708 may be optional operations. In at least one example embodiment, the image processing device 112 receives the input image that has already undergone operations 704 and 708 (e.g., these operations are performed by the source device 104 or by some other device not illustrated in the system 100).

Operation 712 includes scanning the input image including pixels that have either the first state or the second state opposite the first state. For example, operation 712 scans the input image in any one of the eight ways mentioned with reference to operation 508.

Operation 716 includes initiating a first cluster and a first polygon upon encountering a first pixel of the input image that has the first state. As discussed in more detail below, the first polygon may partially define or completely define the first cluster.

Operation 720 includes executing a first set of operations to form the first polygon. For example, operation 720 includes iterating through the operations described with reference to FIGS. 5 and 6A to form the first polygon in the same or similar manner as that shown for the example in FIG. 6B. As may be appreciated in view of the descriptions of FIGS. 5, 6A, 6B, and 13-15, one or more operations in the methods 800 and/or 900 may define additional details of the first set of operations executed in operation 720.

Operation 724 includes generating an indication of one or more characteristics of the input image. The one or more characteristics of the input image may include information about the input image, such as some or all of the information that helps define a complete polygon profile of the input image (see, FIG. 2B, for example). For example, operation 724 generates the indication of the one or more characteristics of the input image in response to determining that the input image has been fully processed (i.e., the determination in operation 512 is 'yes'). In the event that the one or more characteristics of the input image includes a polygon profile of the input image, then the polygon profile of the input image may include polygon profile information for the first polygon and other polygons (if any) formed during the execution of the methods in FIGS. 5 and 6A. Generating the indication in operation 724 may further include generating an output image that is a representation of the input image formed by iterating through the operations in FIGS. 5 and 6A. Still further, the indication may include information in addition to information for the polygon profile of the input image. For example, operation 724 may include examining the information in the polygon profile for a processed input image to generate the additional information, where the additional information may include objects identified and labeled by an object recognition algorithm using the polygon profile as an input and/or any other useful information that may be gleaned from the polygon profile. Additionally or alternatively, operation 724 may include associating data with polygons of the output image for inclusion in an interactive dashboard or other interactive application.

Operation 728 includes outputting the indication generated in operation 724, which may include outputting the indication (e.g., the polygon profile of the input image and/or the output image) to a display or user interface of the output device 128, to a memory (e.g., memory 120 or other local or remote memory) that stores the indication in a format that is capable of display, and/or to another suitable destination. The indication may be audio and/or visual in nature.

Figure 14:
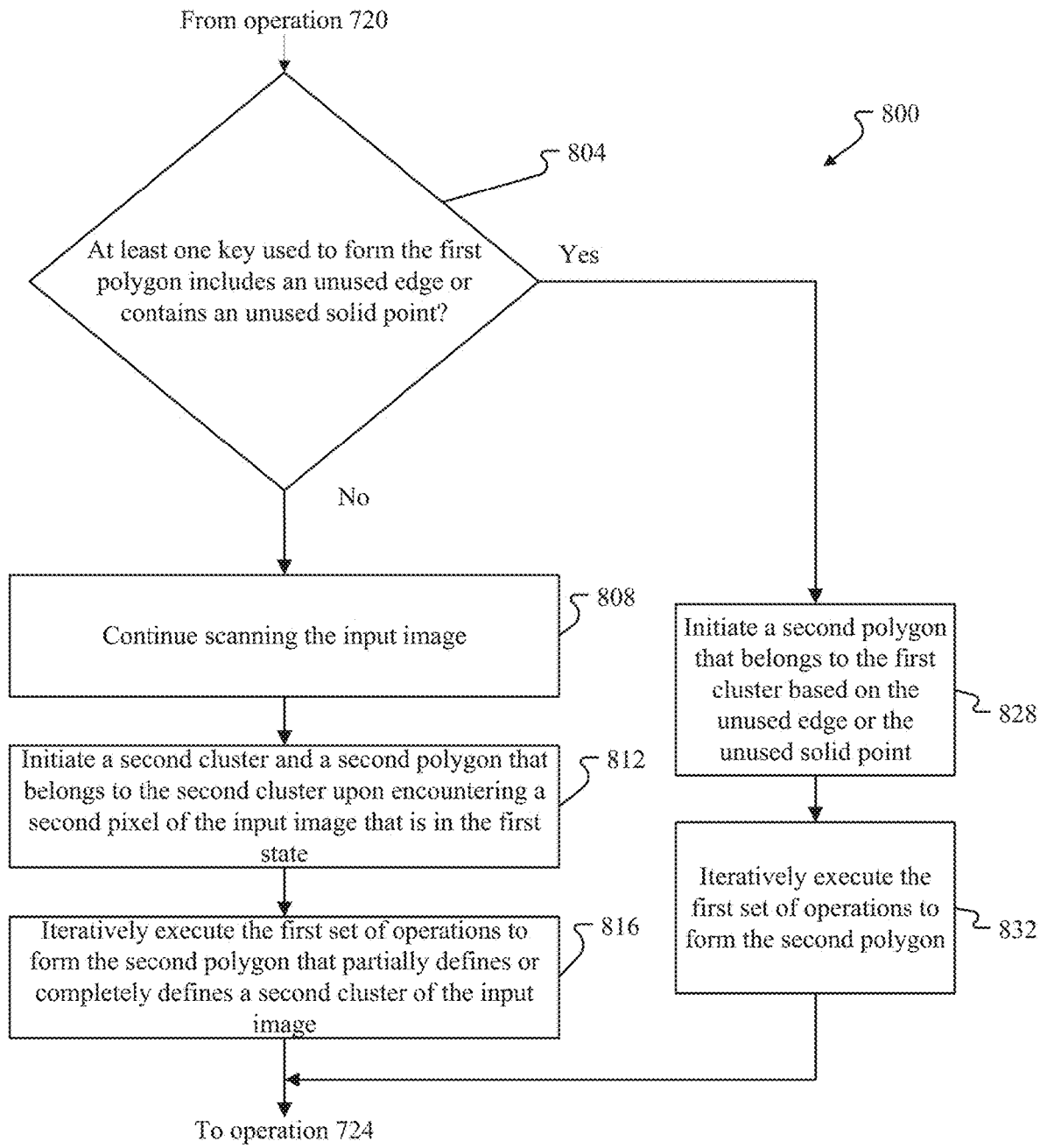
FIG. 14 illustrates a method according to at least one example embodiment.

FIG. 14 illustrates a method 800 according to at least one example embodiment. The method 800 may be performed in addition to all operations or selected operations of the method 700. For example, in at least one example embodiment, the method 800 may take place between operation 720 and operation 724.

The method 800 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 800. The at least one processor may perform the method 800 by executing instructions stored in a memory such as the memory 120. The instructions may correspond to one or more stages of the method 800 described below. The instructions may cause the processor to execute one or more algorithms, such as an image processing algorithm as described in more detail below.

Operation 804 includes determining whether at least one key used to form the first polygon includes an unused edge or contains an unused solid point (see, e.g., operations 536 and 548 in FIG. 5). If so, the method 800 proceeds to operation 808. If not, the method 800 proceeds to operation 828.

If the determination in operation 804 is 'no,' this may be an indication that the first polygon completely defines the first cluster of the input image. For example, as discussed above with reference to FIGS. 5A to 6B, the first polygon is fully formed and completely defines the first cluster when an edge of the first polygon closes on itself (i.e., a head of the edge meets a tail of the edge at a point of a pixel). In other words, the first polygon completely defining the first cluster may automatically follow as a result of operation 804 being a 'no' determination.

Operation 808 includes continuing to scan, for example, in response to a 'no' determination in operation 804, the input image. For example, the scan continues in the same fashion as that selected in operation 712.

Operation 812 includes initiating a second cluster and a second polygon that belongs to the second cluster upon encountering a second pixel of the input image that is in the first state. That is, the determination in operation 512 of FIG. 5 is 'no' so the method continues searching for a pixel hit, where the pixel hit in this case is determined by the second pixel having the first state, which initiates the second cluster and the second polygon.

Operation 816 includes iteratively executing the first set of operations to form the second polygon that partially defines or completely defines the second cluster of the input image. For example, operation 816 includes iterating through the operations of FIGS. 5 and 6A until an edge of the second polygon (which is under construction) closes on itself to partially define the second cluster (as in operation 540) or completely define the second cluster (as in operation 552). Thereafter, the method 800 returns to operation 724 to generate the indication based on output of the method 800.

As noted above, operations 808 to 816 relate to forming two separate polygons, where the first polygon defines a complete cluster and the second polygon partially defines or completely defines a second cluster. However, in some cases, the first polygon and the second polygon may combine to completely define the first cluster (see e.g., the outer polygon and inner polygon 1 of the face in FIGS. 7A and 7B). In this case, the determination is operation 804 is 'yes' in that the key(s) used to form the first polygon contains an edge in the edge stack or a solid point in the solid point stack generated during one or more iterations of operations in FIGS. 5 and 6A, thereby indicating that the first cluster may not yet be fully defined.

If the determination in operation 804 is 'yes,' this may be an indication that the first polygon partially defines the first cluster of the input image. In other words, the first polygon formed by the method 700 may define an outer boundary of a cluster but not the inner boundary of the cluster (see, e.g., the outer polygon in FIG. 7A that defines an outer boundary of a cluster but not the inner boundary). The first polygon completely defining the first cluster may automatically follow as a result of operation 804 being a 'yes' determination.

Operation 828 includes initiating a second polygon that belongs to the first cluster based on the unused edge or the unused solid point. Operation 828 may correspond to operation 544 in FIG. 5.

Operation 832 includes iteratively executing the first set of operations to form the second polygon. For example, operation 816 includes iterating through the operations of FIGS. 5 and 6A until an edge of the second polygon (which is under construction) closes on itself to fully form the second polygon. The fully formed second polygon may be inside the first polygon in the input image and combine with the first polygon to completely define the first cluster (see, e.g., the outer polygon and inner polygon 1 in FIGS. 7A and 7B). Then, the indication is then generated in operation 724 to reflect the result of operations 828 and 832.

Figure 15:
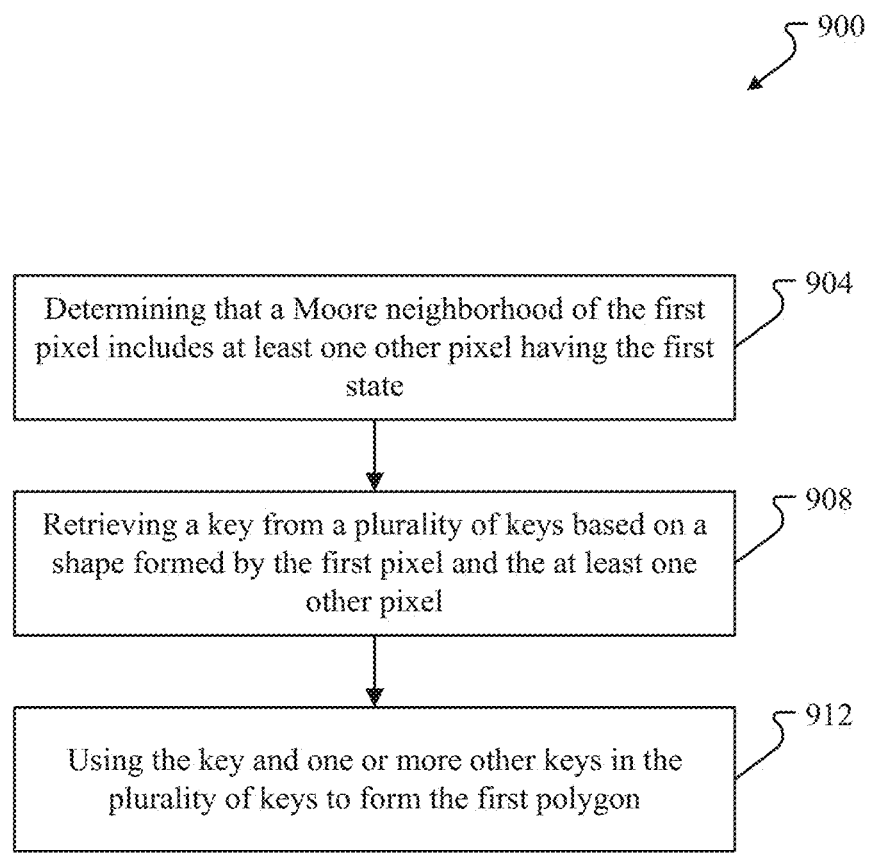
FIG. 15 illustrates a method according to at least one example embodiment.

FIG. 15 illustrates a method 900 according to at least one example embodiment. The method 900 may correspond to one or more operations in the first set of operations mentioned in the description of FIGS. 13 and 14. In at least one example embodiment, the first set of operations includes all or selected ones of the operations in FIGS. 5A to 6B. Operations in the method 900 may correspond to operations in FIGS. 5A and 6B but are described in alternative language.

The method 900 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 900. The at least one processor may perform the method 900 by executing instructions stored in a memory such as the memory 120. The instructions may correspond to one or more stages of the method 900 described below. The instructions may cause the processor to execute one or more algorithms, such as an image processing algorithm as described in more detail below.

Operation 904 includes determining that a Moore neighborhood of the first pixel includes at least one other pixel having the first state. For example, operation 904 scans a Moore neighborhood of the first pixel in accordance with operations described above with reference to FIGS. 5A to 6B and determines that the at least one other pixel has the same, first state as the first pixel (i.e., the at least one other pixel is also a pixel hit).

Operation 908 includes retrieving a key from a plurality of keys that corresponds to a shape formed by the first pixel and the at least one other pixel (see also, operation 524 in FIG. 5). For example, as discussed above, operation 908 includes accessing a look-up table (LUT) that includes the keys in FIGS. 4A to 4D and retrieves the key based on a shape formed by the first pixel and the at least one other pixel. Here, it should be appreciated that the shaded regions of the key will include the first pixel and any other pixels in the at least one other pixel determined to be pixel hits in the Moore neighborhood of the first pixel. Operation 908 retrieves the key by matching a shape formed by the first pixel and the at least one other pixel with a shape of the key.

Operation 912 includes using the key and one or more other keys in the plurality of keys to form the first polygon. For example, operation 912 may include iterating through operations in FIGS. 5 and 6A (e.g., operations 528 (which may include the operations in FIG. 6A), 532, 536, and 548) until reaching a determination that the first polygon is fully formed (e.g., in operations 532, 540, and/or 552).

Although not explicitly shown, it should be appreciated that example embodiments may iterate through the methods 800 and 900 for the entire input image to produce the indication discussed with reference to operations 724 and 728. In addition, some or all of the operations in method 700, 800, and 900 may be performed automatically (i.e., with little or no user intervention).

Figure 16:
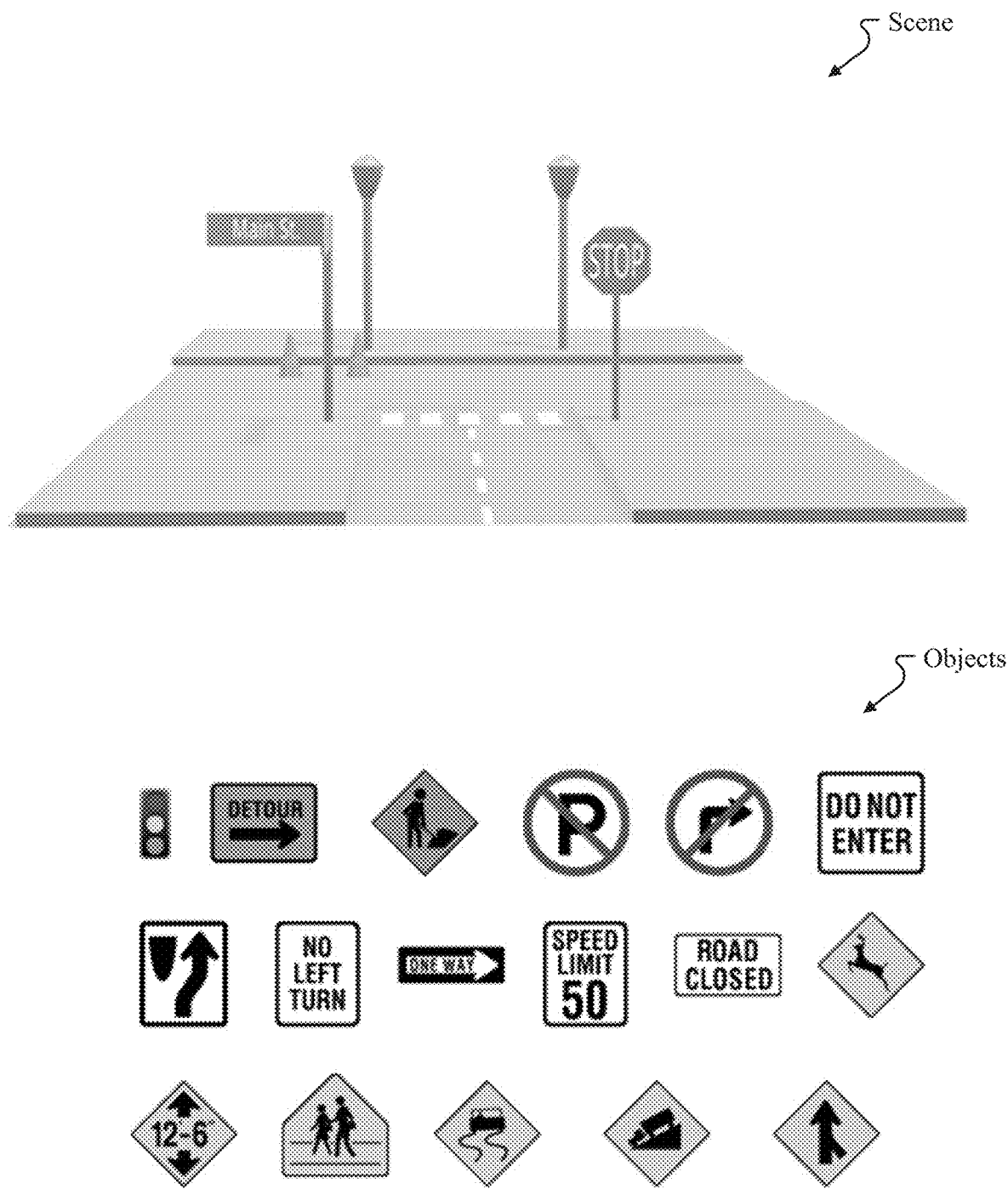
FIG. 16 illustrates an example scene and example objects capable of being processed by imaging processing methods according to at least one example embodiment.

FIG. 16 illustrates an example scene and example objects capable of being processed by imaging processing methods according to example embodiments. As shown, the scene includes a stop sign, street sign, lane divider, crosswalk, lamp posts, traffic cones, curbs, and intersection. In the real world, even more objects such as pedestrians, other cars, bicycles etc. would further complicate the analysis of the scene. Add that the scene could have road construction and is moving in real time with our vehicle and other moving objects and one has a massive computational problem. The efficiency of the algorithm according to example embodiments, however, allows real time analysis of such scenes. Because the algorithm can identify every distinguishable shape in the scene, the algorithm simplifies the work that a downstream processor needs to do. For instance, the algorithm can provide polygon information to identify the street sign, STOP sign, lamp post, and cone shapes, differentiate the lane separator from the crosswalk, differentiate the road from the curb, and recognize text "Main St." and "STOP" on the signs because these too are shapes. Algorithms according to example embodiments accurately find all polygon information and the relationship between those polygons quickly and with reduced processing power so that self-driving vehicles can operate with the same visual information a human driver would have. Furthermore, the more powerful the self-driving processor, the better because processor can operate more efficiently with the algorithm.

Figure 17:
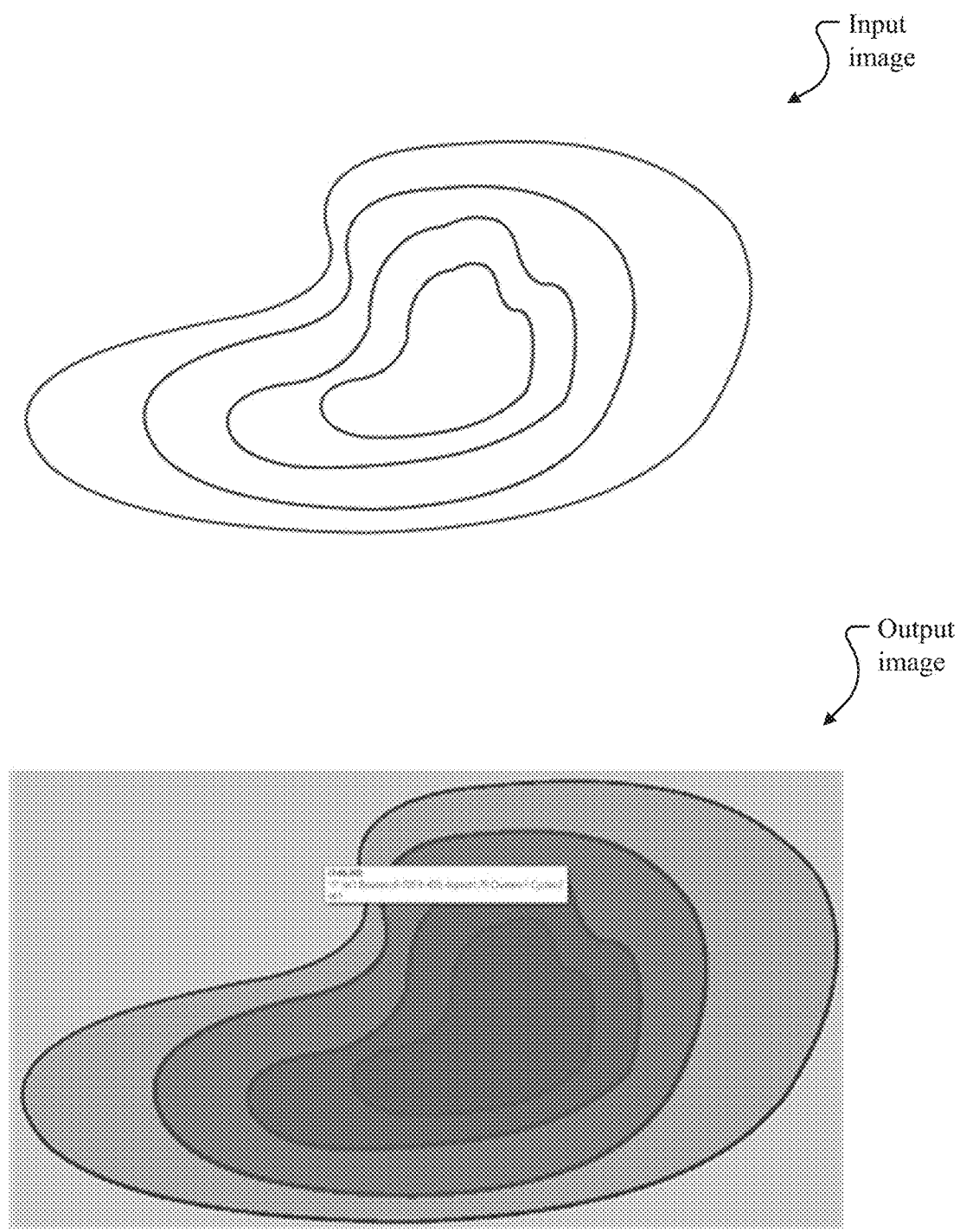
FIG. 17 illustrates an example input image and output image formed by processing the input image according to at least one example embodiment.

FIG. 17 illustrates an example input image and output image formed by processing the input image according to at least one example embodiment. As may be appreciated, FIG. 17 illustrates a 2D line topographical map representing a 3D structure. In this case, it is desirable for a program to "understand" that the contours in the image stack to form a representation of 3D space. One application of the algorithm is precisely this: when the algorithm processes the input image, the polygon profile information has the containment information to show how the polygons stack. In the output image, the z-order stacking is shown by shading each layer or polygon determined by the algorithm.

In view of the above, it should be appreciated that inventive concepts relate to image processing techniques that provide fast and accurate output images and may produce an accurate complete polygon profile (see FIG. 2B) for any 1-bit per pixel input image. An output image and/or the polygon profiles may be further processed for use in a desired application, which include but are not limited to: computer vision, optical character recognition (OCR), autonomous vehicle environment sensing (e.g., correctly identifying objects surrounding the vehicle), topography and cartography (e.g., generic shape matching, automated testing, document production, user test generations, quizzes, videos, geographic information system (GIS) mapping, machine learning an AI for identifying objections in an image, cryptography, robotics, mathematics, cellular automata, topology, discrete mathematics, digital signal processing, and/or the like.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

For purposes of explanation, numerous details are set forth in order to provide a thorough understanding of the present embodiments. It should be appreciated however that the techniques herein may be practiced in a variety of ways be yond the specific details set forth herein.

Furthermore, while the exemplary embodiments illustrated herein may show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a communications network. As will be appreciated from the description, and for reasons of computational efficiency, the components of the system can be arranged at any location within a distributed network without affecting the operation of the system.

Furthermore, it should be appreciated that the various links, including communications channel(s), connecting the elements (which may not be shown) can be wired or wireless links, or any combination thereof, or any other known or later developed element(s) that is/are capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts/operational flows have been discussed in relation to a particular exemplary sequence of events, it should be appreciated that changes to this sequence can occur without materially effecting the operation of the embodiment(s). Additionally, the exact sequence of events need not occur as set forth in the exemplary embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable.

As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

Additionally, the systems, methods and protocols described herein can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a smartphone, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, ABX, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, workstation or mobile device platforms, e.g., smartphones or mobile phones or vehicles. Alternatively, the disclosed system may be implemented partially in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, mobile device, smartphone, a microprocessor, or the like. In these instances, the systems and methods of this invention can be implemented as program embedded on personal computer such as JAVA® or CGI script, as a resource residing on a server or graphics workstation, as a routine embedded in a dedicated image processing system, as a plug-in, or the like. The system can also be implemented by physically incorporating the system and method into a software and/or hardware system, such as the hardware and software systems of an image processor.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured according to the following:

(1) A device, comprising:
   at least one processor; and
   memory including instructions that when executed by the at least one processor, cause the at least one processor to:
      scan an input image including pixels that have either a first state or a second state opposite the first state;
      initiate a first cluster and a first polygon that belongs to the first cluster upon encountering a first pixel of the input image that has the first state;
      execute a first set of operations to form the first polygon;
      generate an indication of one or more characteristics of the input image based on at least the first cluster; and
      output the indication.

(2) The device of (1), wherein the at least one processor iteratively executes the first set of operations to form the first polygon.

(3) The device of one or more of (1) to (2), wherein the instructions include instructions that cause the at least one processor to:
   determine that at least one key used to form the first polygon does not include an unused edge or contain an unused solid point;
   continue scanning the input image; and
   initiate a second cluster and a second polygon that belongs to the second cluster upon encountering a second pixel of the input image that is in the first state.

(4) The device of one or more of (1) to (3), wherein the instructions include instructions that cause the at least one processor to:
   iteratively execute the first set of operations to form the second polygon that completely defines or partially defines the second cluster of the input image; and
   generate the indication based on the first cluster and the second cluster.

(5) The device of one or more of (1) to (4), wherein the instructions include instructions that cause the at least one processor to:
   determine that at least one key used to form the first polygon includes an unused edge or contains an unused solid point;
   initiate a second cluster and a second polygon that belongs to the first cluster based on the unused edge or the unused solid point; and
   iteratively execute the first set of operations to form the second polygon, wherein the first polygon and the second polygon combine to completely define the first cluster.

(6) The device of one or more of (1) to (5), wherein the instructions include instructions that cause the at least one processor to:
   generate the input image from a source image by converting each pixel of the source image to have the first state or the second state based on pixel values of each pixel of the source image.

(7) The device of one or more of (1) to (6), wherein the first state corresponds to one of black coloring or white coloring, and wherein the second state corresponds to the other of black coloring or white coloring.

(8) The device of one or more of (1) to (7), wherein the first set of operations includes:
   determining that a Moore neighborhood of the first pixel includes at least one other pixel having the first state;
   retrieving a key from a plurality of keys based on a shape formed by the first pixel and the at least one other pixel; and
   using the key and one or more other keys in the plurality of keys to form the first polygon.

(9) The device of one or more of (1) to (8), wherein the instructions include instructions that cause the at least one processor to generate the plurality of keys, a number of the plurality of keys being based on a number of pixels in the Moore neighborhood of the first pixel.

(10) The device of one or more of (1) to (9), wherein the number of the plurality of keys is at least 256.

(11) A method, comprising:
   scanning an input image including pixels that have either a first state or a second state opposite the first state;
   initiating a first cluster and a first polygon that belongs to the first cluster upon encountering a first pixel of the input image that has the first state;

executing a first set of operations to form the first polygon;

generating an indication of one or more characteristics of the input image based on at least the first cluster; and outputting the indication.

(12) The method of (11), wherein executing the first set of operations iteratively executes the first set of operations to form the first polygon.

(13) The method of one or more of (11) to (12), further comprising:

determining that at least one key used to form the first polygon does not include an unused edge or contain an unused solid point;

continuing to scan the input image;

initiating a second cluster and a second polygon that belongs to the second cluster upon encountering a second pixel of the input image that is in the first state;

iteratively executing the first set of operations to form the second polygon that completely defines or partially defines the second cluster; and generating the indication based on the first cluster and the second cluster.

(14) The method of one or more of (11) to (13), further comprising:

determining that at least one key used to form the first polygon includes an unused edge or contains an unused solid point;

initiating a second polygon that belongs to the first cluster based on the unused edge or the unused solid point; and iteratively executing the first set of operations to form the second polygon.

(15) The method of one or more of (11) to (14), wherein the first polygon and the second polygon combine to fully define the first cluster.

(16) The method of one or more of (11) to (15), further comprising:

generating the input image from a source image by converting each pixel of the source image to have the first state or the second state based on pixel values of each pixel of the source image.

(17) The method of one or more of (11) to (16), wherein the first state corresponds to one of black coloring or white coloring, and wherein the second state corresponds to the other of black coloring or white coloring.

(18) The method of one or more of (11) to (17), wherein the first set of operations includes:

determining that a Moore neighborhood of the first pixel includes at least one other pixel having the first state;

retrieving a key from a plurality of keys based on a shape formed by the first pixel and the at least one other pixel; and using the key and one or more other keys in the plurality of keys to form the first polygon that includes the first pixel and the at least one other pixel.

(19) The method of one or more of (11) to (18), further comprising:

generating the plurality of keys, a number of the plurality of keys being based on a number of pixels in the Moore neighborhood of the first pixel.

(20) A system, comprising:

a display;

at least one processor; and memory including instructions that when executed by the at least one processor, cause the at least one processor to:

scan an input image including pixels that have either a first state or a second state opposite the first state;

initiate a first cluster and a first polygon that belongs to the first cluster upon encountering a first pixel of the input image that has the first state;

execute a first set of operations to form the first polygon;

generate an indication of one or more characteristics of the input image based on at least the first cluster; and output the indication to the display.

What is claimed is:

1. A non-transitory computer-readable information storage media having instructions stored thereon that when executed by at least one processor, cause the at least one processor to perform a method for the generation of a outline of at least a portion of an image comprising:

scanning an input image including pixels that have either a first state or a second state, opposite the first state;

initiating a first cluster and a first polygon, that belongs to the first cluster, upon encountering a first pixel of the input image that has the first state;

executing a first set of operations to form the first polygon;

determining that at least one key used to form the first polygon does not include an unused edge or contain an unused solid point, wherein the at least one key represents a number of possible states of pixels that surround the first pixel;

continuing scanning of the input image;

initiating a second cluster and a second polygon, that belongs to the second cluster, upon encountering a second pixel of the input image that is in the first state;

generating an indication of one or more characteristics of the input image based on at least the first cluster; and outputting the indication.

2. The media of claim 1, further comprising iteratively executing the first set of operations to form the first polygon.

3. The media of claim 1, further comprising:

iteratively executing the first set of operations to form the second polygon that completely defines or partially defines the second cluster of the input image; and generating the indication based on the first cluster and the second cluster.

4. The media of claim 1, further comprising generating the input image from a source image by converting each pixel of the source image to have the first state or the second state based on pixel values of each pixel of the source image.

5. The media of claim 4, wherein the first state corresponds to one of black coloring or white coloring, and wherein the second state corresponds to the other of black coloring or white coloring.

6. The media of claim 1, wherein the first set of operations includes:

determining that a Moore neighborhood of the first, pixel includes at least one other pixel having the first state;

retrieving a key from a plurality of keys based on a shape formed by the first pixel and the at least one other pixel; and using the key and one or more other keys in the plurality of keys to form the first polygon.

7. The media of claim 6, further comprising generating the plurality of keys, a number of the plurality of keys being based on a number of pixels in the Moore neighborhood of the first pixel.

8. The media of claim 7, wherein the number of the plurality of keys is at least 256.

9. The media of claim 1, wherein there are 256 keys, with one key where no pixels surrounding a reference pixel have the same state, and another key where all pixels surrounding the reference pixel have the same state.

10. The media of claim 1, wherein there are 256 keys, and the 256 keys form a complete set that is capable of defining a polygon edge within the input image, and the input image is digitized and 2-Dimensional.

11. The media of claim 1, wherein an unused edge can indicate existence of another polygon in proximity to the first polygon.

12. The media of claim 11, further comprising initiating a new polygon using an unused edge from the edge stack.

13. The media of claim 1, wherein any unused edges of a key are stored to an edge stack.

14. A non-transitory computer-readable information storage media having instructions stored thereon that when executed by at least one processor, cause the at least one processor to perform a method comprising:
scanning an input image including pixels that have either a first state or a second state, opposite the first state;
initiating a first cluster and a first polygon, that belongs to the first cluster, upon encountering a first pixel of the input image that has the first state;
executing a first set of operations to form the first polygon;
determining that at least one key used to form the first polygon includes an unused edge or contains an unused solid point, wherein the at least one key represents a number of possible states of pixels that surround the first pixel;
initiating a second cluster and a second polygon, that belongs to the first cluster, based on the unused edge or the unused solid point;
iteratively executing the first set of operations to form the second polygon, wherein the first polygon and the second polygon combine to completely define the first cluster;
generating an indication of one or more characteristics of the input image based on at least the first cluster; and
outputting the indication.

15. A non-transitory computer-readable information storage media having instructions stored thereon that when executed by at least one processor, cause the at least one processor to perform a method comprising:
scanning an input image including pixels that have either a first state or a second state, opposite the first state;
initiating a first cluster and a first polygon, that belongs to the first cluster, upon encountering a first pixel of the input image that has the first state;
executing a first set of operations to form the first polygon;
determining that at least one key used to form the first polygon does not include an unused edge or contain an unused solid point, wherein the at least one key represents a number of possible states of pixels that surround the first pixel;
continuing to scan the input image;
initiating a second cluster and a second polygon, that belongs to the second cluster, upon encountering a second pixel of the input image that is in the first state;
iteratively executing the first set of operations to form the second polygon that completely defines or partially defines the second cluster;
generating an indication based on the first cluster and the second cluster;
generating an indication of one or more characteristics of the input image based on at least the first cluster; and
outputting the indication.

16. The media of claim 15, wherein executing the first set of operations iteratively executes the first set of operations to form the first polygon.

17. The media of claim 15, further comprising:
determining that at least one key used to form the first polygon includes an unused edge or contains an unused solid point;
initiating a second polygon that belongs to the first cluster based on the unused edge or the unused solid point; and
iteratively executing the first set of operations to form the second polygon.

18. The media of claim 17, wherein the first polygon and the second polygon combine to fully define the first cluster.

19. The media of claim 15, further comprising:
generating the input image from a source image by converting each pixel of the source image to have the first state or the second state based on pixel values of each pixel of the source image.

20. The media of claim 19, wherein the first state corresponds to one of black coloring or white coloring, and wherein the second state corresponds to the other of black coloring or white coloring.

21. The media of claim 15, wherein the first set of operations includes:
determining that a Moore neighborhood of the first pixel includes at least one other pixel having the first state;
retrieving a key from a plurality of keys based on a shape formed by the first pixel and the at least one other pixel; and
using the key and one or more other keys in the plurality of keys to form the first polygon that includes the first pixel and the at least one other pixel.

22. The media of claim 1, further comprising:
generating the plurality of keys, a number of the plurality of keys being based on a number of pixels in the Moore neighborhood of the first pixel.

23. The media of claim 15, wherein an unused edge can indicate existence of another polygon in proximity to the first polygon.

24. The media of claim 15, wherein there are 256 keys, with one key where no pixels surrounding a reference pixel have the same state, and another key where all pixels surrounding the reference pixel have the same state.

25. The media of claim 15, wherein the 256 keys form a complete set that is capable of defining a polygon edge within the input image, and the input image is digitized and 2-Dimensional.

26. A non-transitory computer-readable information storage media having instructions stored thereon that when executed by at least one processor, cause the at least one processor to perform a method comprising:
scanning an input image including pixels that have either a first state or a second state, opposite the first state;
initiating a first cluster and a first polygon, that belongs to the first cluster, upon encountering a first pixel of the input image that has the first state;
executing a first set of operations to form the first polygon;
determining that at least one key used to form the first polygon does not include an unused edge or contain an unused solid point, wherein the at least one key represents a number of possible states of pixels that surround the first pixel;
continuing to scan the input image;
initiating a second cluster and a second polygon, that belongs to the second cluster, upon encountering a second pixel of the input image that is in the first state;

generating an indication of one or more characteristics of the input image based on at least the first cluster; and outputting the indication to a display.

27. The media of claim 26, wherein an unused edge can indicate existence of another polygon in proximity to the first polygon.

28. The media of claim 26, wherein there are 256 keys, with one key where no pixels surrounding a reference pixel have the same state, and another key where all pixels surrounding the reference pixel have the same state.

29. The media of claim 26, wherein the 256 keys form a complete set that is capable of defining a polygon edge within the input image, and the input image is digitized and 2-Dimensional.

* * * * *